US009342980B2

United States Patent
Umetani et al.

(10) Patent No.: US 9,342,980 B2
(45) Date of Patent: May 17, 2016

(54) COMMUNICATION APPARATUS, WHICH COMMUNICATES WITH AN EXTERNAL TERMINAL, METHOD OF CONTROLLING A COMMUNICATION APPARATUS WHICH COMMUNICATES WITH AN EXTERNAL TERMINAL, PROGRAM, AND SERVER

(71) Applicant: Panasonic Corporation, Osaka (JP)

(72) Inventors: Hideo Umetani, Osaka (JP); Masaru Yamaoka, Osaka (JP); Gantetsu Matsui, Kyoto (JP); Mahbub Rashid, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 142 days.

(21) Appl. No.: 14/355,706

(22) PCT Filed: Jul. 24, 2013

(86) PCT No.: PCT/JP2013/004503
§ 371 (c)(1),
(2) Date: May 1, 2014

(87) PCT Pub. No.: WO2014/041735
PCT Pub. Date: Mar. 20, 2014

(65) Prior Publication Data
US 2014/0285325 A1 Sep. 25, 2014

(30) Foreign Application Priority Data
Sep. 12, 2012 (JP) ................. 2012-200920

(51) Int. Cl.
*G08C 17/02* (2006.01)
*H04L 12/28* (2006.01)

(52) U.S. Cl.
CPC ............ *G08C 17/02* (2013.01); *H04L 12/2825* (2013.01); *G08C 2201/50* (2013.01);

(Continued)

(58) Field of Classification Search
None
See application file for complete search history.

(56) References Cited

U.S. PATENT DOCUMENTS 7,904,074 B2 * 3/2011 Karaoguz ........... H04L 12/2803
455/418
8,386,202 B2 * 2/2013 Aisa ........................ H04B 3/54
324/76.11

(Continued)

FOREIGN PATENT DOCUMENTS

JP 2012-5116 1/2012
WO 2012/011289 1/2012

OTHER PUBLICATIONS

International Search Report issued Oct. 15, 2013 in International Application No. PCT/JP2013/004503.

*Primary Examiner* — Brian Miller
(74) *Attorney, Agent, or Firm* — Wenderoth, Lind & Ponack, L.L.P.

(57) ABSTRACT

A generation unit generates a command based on operation history information read from a storage unit and operation status information obtained by an obtainment unit when power is supplied from a first power source unit to a communication apparatus, and generates the command based on the operation history information read from the storage unit when the power is not supplied from the first power source unit to the communication apparatus, when power is supplied from a second power source unit to each of the storage unit, the generation unit, and a proximity wireless communication unit.

9 Claims, 26 Drawing Sheets

(52) U.S. Cl.
CPC ........ *G08C2201/91* (2013.01); *G08C 2201/93* (2013.01); *H04L 12/2818* (2013.01); *H04L 2012/285* (2013.01); *H04L 2012/2841* (2013.01)

(56) References Cited

U.S. PATENT DOCUMENTS

| | | | | |
|---|---|---|---|---|
| 8,560,012 B2* | 10/2013 | Ohnishi | ................ | G08C 17/00 340/10.42 |
| 8,786,414 B2* | 7/2014 | Nakajima | ............ | G08C 17/02 340/12.22 |
| 2011/0050402 A1* | 3/2011 | Ineichen | ................ | G08C 17/02 340/12.5 |
| 2012/0109395 A1* | 5/2012 | Finch | .................... | G06Q 50/06 700/295 |
| 2012/0178367 A1 | 7/2012 | Matsumoto et al. | | |
| 2013/0057762 A1 | 3/2013 | Yoshida et al. | | |
| 2013/0204444 A1* | 8/2013 | Ahn | ..................... | H04L 12/2816 700/286 |
| 2013/0265061 A1* | 10/2013 | Chun | .................. | H04L 12/2823 324/537 |
| 2014/0180488 A1* | 6/2014 | Hirayama | ........... | H04L 12/2816 700/295 |
| 2014/0285325 A1* | 9/2014 | Umetani | ................ | G08C 17/02 340/10.5 |
| 2014/0306832 A1* | 10/2014 | Goose | ..................... | H04Q 9/00 340/870.99 |
| 2014/0350700 A1* | 11/2014 | Yoshitani | ............ | H04W 76/048 700/22 |
| 2014/0372619 A1* | 12/2014 | Park | ....................... | G08C 17/02 709/228 |

* cited by examiner

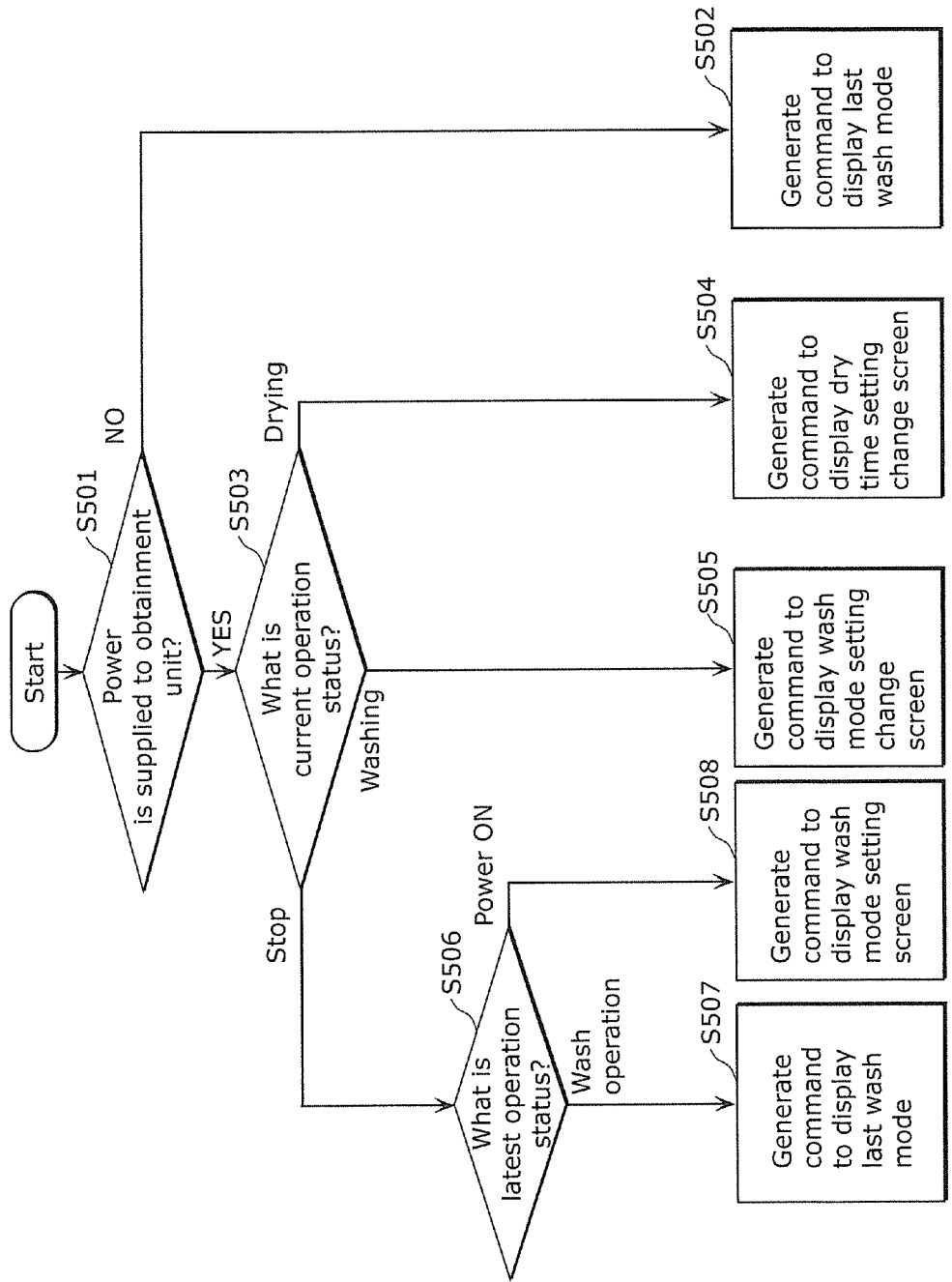

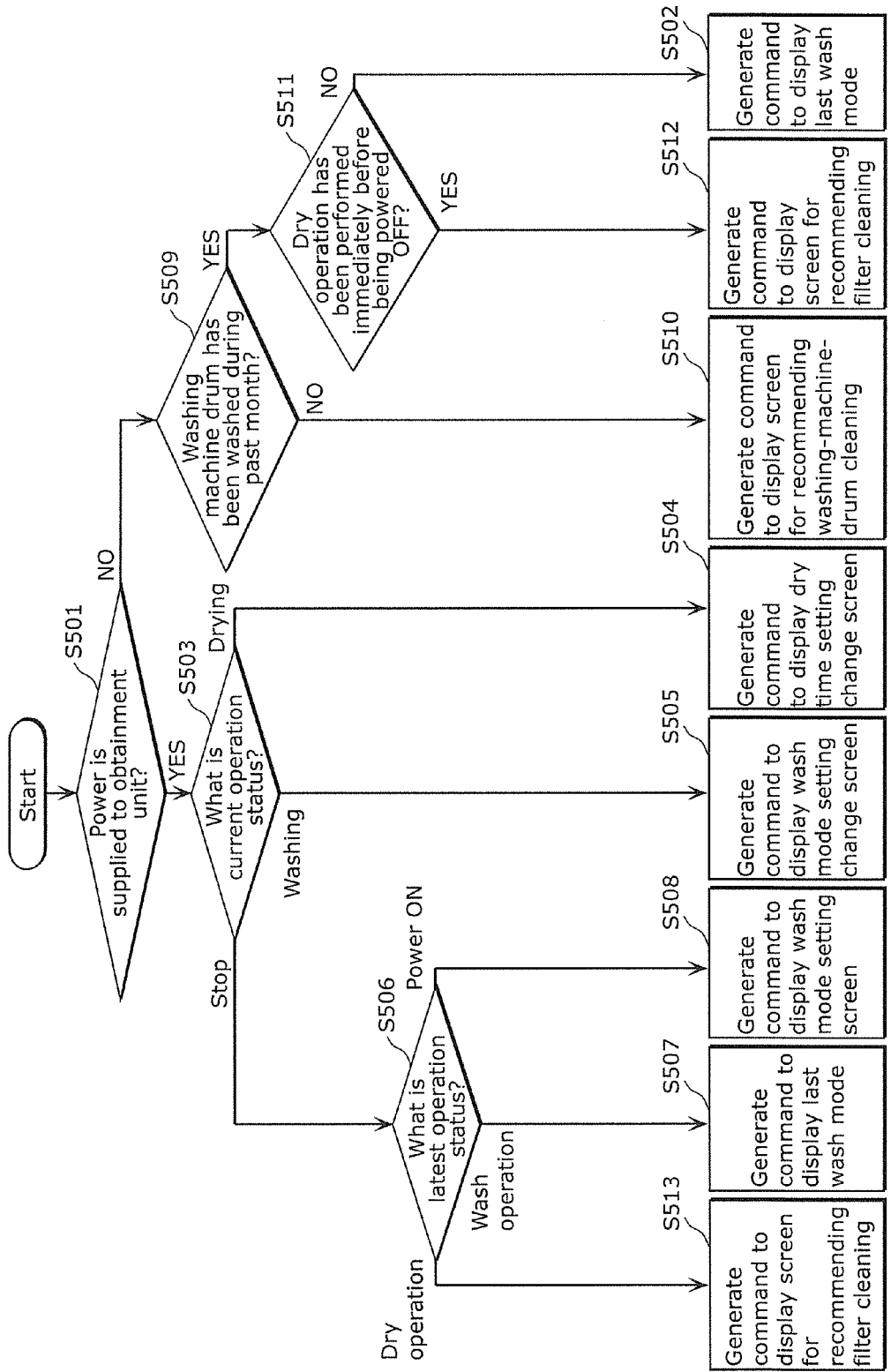

FIG. 11

| First power source unit | Current operation status | Last operation status | Command to be generated |
|---|---|---|---|
| OFF | — | Dry operation | Command to display screen for recommending filter cleaning |
| OFF | — | Wash operation | Command to display last wash mode |
| ... | ... | ... | ... |
| ON | Washing | Dry operation | Command to display wash mode setting change screen |
| ON | Drying | Wash operation | Command to display dry time setting change screen |
| ON | Stop | Power ON | Command to display wash mode setting change screen |
| ON | Stop | Dry operation | Command to display last wash mode |
| ON | Stop | Wash operation | Command to display screen for recommending filter cleaning |
| ... | ... | ... | ... | ant

COMMUNICATION APPARATUS, WHICH COMMUNICATES WITH AN EXTERNAL TERMINAL, METHOD OF CONTROLLING A COMMUNICATION APPARATUS WHICH COMMUNICATES WITH AN EXTERNAL TERMINAL, PROGRAM, AND SERVER

BACKGROUND OF THE INVENTION

1. Technical Field

The present invention relates to a communication apparatus which communicates with an external terminal, a method of controlling the communication apparatus, a program, and a server.

2. Description of the Related Art

In recent years, a system for collecting information on a device via a network, a system for operating a device using an external terminal, and so on, have been proposed by device manufacturers. Here, the information on device is information indicating the product number, operation history, operation status, and so on, of the device.

These device manufacturers have been examining the possibility of developing such systems to new services. The new services include, for example, a service allowing users to view information indicating operation statuses of home appliances using external terminals, and a service allowing the users to set the home appliances to settings they want using the external terminals. Such services are provided from these device manufacturers to the users as applications that run on the external terminals. Coordinating the applications that run on the external terminals and the home appliances used by the users makes the above-described services available to the users.

SUMMARY OF THE INVENTION

1. Technical Problem

However, the above-described conventional systems have the following problem. The applications that run on the external terminals have become more and more complicated to support diversifying services. Thus, when a user tries to view information indicating operation status of a home appliance using an external terminal for example, the user has to operate the external terminal many times to arrive at the target information using an application. This causes the problem that the user cannot obtain the target information easily.

In view of the above, the present invention provides a communication apparatus which allows the user to obtain the target information easily, a method of controlling the communication apparatus, a program, and a server.

2. Solution to the Problem

A communication apparatus according to an aspect of the present invention is a communication apparatus which communicates with an external terminal, the communication apparatus including: a device unit configured to cause the communication apparatus to operate; and a communication unit configured to perform proximity wireless communication with the external terminal, wherein the device unit includes: a first power source unit configured to supply power to the communication apparatus, the first power source unit being a main power source of the communication apparatus; a control unit configured to control an operation of the communication apparatus; and an obtainment unit configured to obtain operation status information indicating a current operation status of the communication apparatus controlled by the control unit, the communication unit includes: an antenna unit configured to receive a radio wave output from the external terminal; a storage unit configured to store operation history information indicating a past operation status of the communication apparatus controlled by the control unit; a generation unit configured to generate a command for controlling the external terminal; a proximity wireless communication unit configured to transmit the command to the external terminal via the antenna unit through proximity wireless communication; and a second power source unit configured to generate power using the radio wave received by the antenna unit and to supply the power to each of the storage unit, the generation unit, and the proximity wireless communication unit, and when the power is supplied from the second power source unit to each of the storage unit, the generation unit, and the proximity wireless communication unit, the generation unit is configured to: generate the command based on the operation history information read from the storage unit and the operation status information obtained by the obtainment unit when the power is supplied from the first power source unit to the communication apparatus; and generate the command based on the operation history information read from the storage unit when the power is not supplied from the first power source unit to the communication apparatus.

It is to be noted that general or specific aspects of the above may be realized by a system, a method, an integrated circuit, a computer program, or a computer-readable recording medium such as a CD-ROM, and an arbitrary combination of a system, a method, an integrated circuit, a computer program, and a recording medium.

3. Advantageous Effects of the Invention

With the communication apparatus according to an aspect of the present invention, the generation unit generates a command for causing the external terminal to provide the user with information which is expected to be required by the user on the communication apparatus, based on the operation status information indicating the current operation status of the communication apparatus and the operation history information indicating the past operation status of the communication apparatus. This significantly reduces time it takes for and the number of operations performed by a user to obtain the target information using the external terminal, which allows the user to obtain the target information easily.

BRIEF DESCRIPTION OF THE DRAWINGS

FIG. 9 is a flowchart illustrating a flow of a command generation scheme according to Embodiment 1.

FIG. 10 is a flowchart illustrating a command generation scheme according to a modification of Embodiment 1.

FIG. 11 illustrates a table of a database for generating the command.

DETAILED DESCRIPTION OF THE INVENTION

Figure 1:
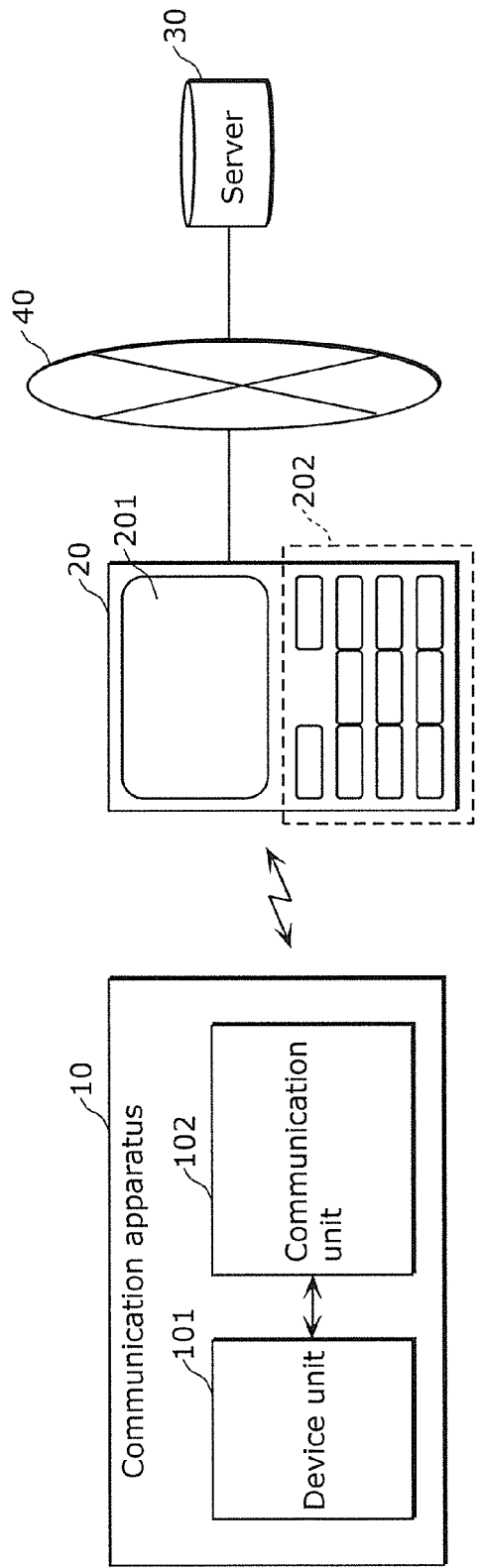
FIG. 1 illustrates a structure of a system including a communication apparatus according to Embodiment 1.

Underlying Knowledge Forming Basis of the Present Invention

The inventors have found that the system described in "Background" section has the following problem.

In the system disclosed in Japanese Unexamined Patent Application Publication No. 2012-005116, a mobile phone terminal which serves as a source device and a television receiver which serves as a sink device are mutually connected via a high-definition multimedia interface (HDMI, registered trademark) cable. This can cause the television receiver to display the content reproduced by the mobile phone terminal, for example.

Furthermore, the mobile phone terminal issues a command for causing the television receiver to display information on the status (e.g. e-mail reception) of the mobile phone terminal. This allows the user to easily know the status of the mobile phone terminal by viewing the information displayed on the television receiver.

However, with the above-described system, the user cannot obtain information indicating an operation status of the television receiver and so on using the mobile phone terminal.

In order to solve the above problem, a communication apparatus according to an aspect of the present invention is a communication apparatus which communicates with an external terminal, the communication apparatus including: a device unit configured to cause the communication apparatus to operate; and a communication unit configured to perform proximity wireless communication with the external terminal, wherein the device unit includes: a first power source unit configured to supply power to the communication apparatus, the first power source unit being a main power source of the communication apparatus; a control unit configured to control an operation of the communication apparatus; and an obtainment unit configured to obtain operation status information indicating a current operation status of the communication apparatus controlled by the control unit, the communication unit includes: an antenna unit configured to receive a radio wave output from the external terminal; a storage unit configured to store operation history information indicating a past operation status of the communication apparatus controlled by the control unit; a generation unit configured to generate a command for controlling the external terminal; a proximity wireless communication unit configured to transmit the command to the external terminal via the antenna unit through proximity wireless communication; and a second power source unit configured to generate power using the radio wave received by the antenna unit and to supply the power to each of the storage unit, the generation unit, and the proximity wireless communication unit, and when the power is supplied from the second power source unit to each of the storage unit, the generation unit, and the proximity wireless communication unit, the generation unit is configured to: generate the command based on the operation history information read from the storage unit and the operation status information obtained by the obtainment unit when the power is supplied from the first power source unit to the communication apparatus; and generate the command based on the operation history information read from the storage unit when the power is not supplied from the first power source unit to the communication apparatus.

With this aspect, the generation unit generates a command for causing the external terminal to provide the user with information which is expected to be required by the user on the communication apparatus, based on the operation status information indicating the current operation status of the communication apparatus and the operation history information indicating the past operation status of the communication apparatus. This significantly reduces the time it takes for and the number of operations performed by a user to obtain the target information using the external terminal, which allows the user to obtain the target information easily. Furthermore, even when the main power source of the communication apparatus is OFF, the generation unit can generate the command using the power generated by the second power source unit.

Furthermore, in the communication apparatus according to an aspect of the present invention, the generation unit may be configured to generate the command for causing a display unit of the external terminal to display screen information.

With this aspect, it is allowed to cause the display unit of the external terminal to display the information which is expected to be required by the user on the communication apparatus as the screen information.

Furthermore, in the communication apparatus according to an aspect of the present invention, the generation unit may be configured to request the obtainment unit to obtain the operation status information when the power is supplied from the first power source unit to the communication apparatus and the power is supplied from the second power source unit to each of the storage unit, the generation unit, and the proximity wireless communication unit, and the obtainment unit may be configured to obtain the operation status information when requested by the generation unit to obtain the operation status information.

With this aspect, the obtainment unit can obtain the operation status information when requested by the generation unit to obtain the operation status information.

Furthermore, in the communication apparatus according to an aspect of the present invention, the device unit may further include a sensor which detects a value relating to the communication apparatus, and the generation unit may be configured to obtain the value detected by the sensor and generate the command based on the obtained value of the sensor.

With this aspect, the command generated based on the value of the sensor allows causing the external terminal to provide the user with more appropriate information for the user.

Furthermore, in the communication apparatus according to an aspect of the present invention, the device unit may further include a timer which measures an elapsed time from a time of a change in the value of the sensor, the control unit may be configured to activate the timer at the time of the change in the value of the sensor, and the generation unit may be configured to obtain a value of the timer and generate the command based on the obtained value of the timer and the value of the sensor.

With this aspect, it is possible to cause the external terminal to provide the user with information that is more appropriate for the user using the command generated based on the value of the sensor and the value of the timer.

Furthermore, in the communication apparatus according to an aspect of the present invention, the proximity wireless communication unit may be configured to transmit the operation history information together with the command to the external terminal.

With this aspect, the user can obtain the operation history information by the external terminal.

Furthermore, in the communication apparatus according to an aspect of the present invention, the proximity wireless communication unit may be further configured to obtain communication performance information of the external terminal transmitted from the external terminal, and to set a transmission amount of the operation history information based on the obtained communication performance information.

With this aspect, the operation history information can be transmitted with an optimal transmission amount according to the communication performance of the external terminal, which optimizes the transmission time.

A method of controlling a communication apparatus according to an aspect of the present invention is a method of controlling a communication apparatus which communicates with an external terminal, the method including: obtaining operation status information indicating a current operation status of the communication apparatus when a first power from a main power source is supplied to the communication apparatus; storing operation history information indicating a past operation status of the communication apparatus when the first power is supplied to the communication apparatus; receiving a radio wave output from the external terminal by an antenna unit of the communication apparatus; generating a command for controlling the external terminal using a second power generated using the radio wave received by the antenna unit; and transmitting the command to the external terminal through proximity wireless communication using the second power. The generating of a command includes: generating the command based on the operation history information and the operation status information when the first power is supplied to the communication apparatus; and generating the command based on the operation history information when the first power is not supplied to the communication apparatus.

With this aspect, a command for causing the external terminal to provide the user with information which is expected to be required by the user on the communication apparatus is generated based on the operation status information indicating the current operation status of the communication apparatus and the operation history information indicating the past operation status of the communication apparatus. This significantly reduces the time it takes for and the number of operations performed by a user to obtain the target information using the external terminal, which allows the user to obtain the target information easily. Furthermore, even when the main power source of the communication apparatus is OFF, the command is generated with the second power generated using the received radio wave.

A program according to an aspect of the present invention is a program for controlling a communication apparatus which communicates with an external terminal, the program causing a computer to execute: obtaining operation status information indicating a current operation status of the communication apparatus when a first power from a main power source is supplied to the communication apparatus; storing operation history information indicating a past operation status of the communication apparatus when the first power is supplied to the communication apparatus; receiving a radio wave output from the external terminal by an antenna unit of the communication apparatus; generating a command for controlling the external terminal using a second power generated using the radio wave received by the antenna unit, including: generating the command based on the operation history information and the operation status information when the first power is supplied to the communication apparatus; and generating the command based on the operation history information when the first power is not supplied to the communication apparatus; and transmitting the command to the external terminal through proximity wireless communication using the second power.

With this aspect, a command for causing the external terminal to provide the user with information which is expected to be required by the user on the communication apparatus is generated based on the operation status information indicating the current operation status of the communication apparatus and the operation history information indicating the past operation status of the communication apparatus. This significantly reduces time it takes for and the number of operations performed by a user to obtain the target information using the external terminal, which allows the user to obtain the target information easily. Furthermore, even when the main power source of the communication apparatus is OFF, the command is generated with the second power generated using the received radio wave.

A server according to an aspect of the present invention includes: a program storage unit configured to store the above-described program; and a network communication unit configured to transmit the program stored in the program storage unit to a communication apparatus via an external terminal.

With this aspect, the above-described program can be transmitted to the communication apparatus via the external terminal. This allows executing the program with the communication apparatus. This significantly reduces the time it takes for and the number of operations performed by a user to obtain the target information using the external terminal, which allows the user to obtain the target information easily. Furthermore, even when the main power source of the communication apparatus is OFF, the command is generated with the power generated by the second power source unit.

It is to be noted that general or specific aspects of the above may be realized by a system, a method, an integrated circuit, a computer program, or a computer-readable recording medium such as a CD-ROM, and an arbitrary combination of a system, a method, an integrated circuit, a computer program, and a recording medium.

The following describes the embodiments in detail with reference to the drawing figures. It is to be noted that each of the embodiments described below is a comprehensive or specific example. The numerical values, shapes, materials, constituent elements, the arrangement and connection of the constituent elements, steps, the processing order of the steps, etc. shown in the following embodiments are mere examples, and thus do not limit the present invention. Furthermore, out of the constituent elements in the following embodiments, the constituent elements not stated in the independent claims describing the broadest concept of the present invention are described as optional constituent elements.

Embodiment 1

Overall Structure of the System

FIG. 1 illustrates a structure of a system including a communication apparatus 10 according to Embodiment 1. The system in the Drawing includes the communication apparatus 10, an external terminal 20, and a server 30.

The communication apparatus 10 is a home appliance, for example. Home appliances include, for example, a) audio visual (AV) home appliances such as television receivers and digital recorders, b) household home appliances such as refrigerators, washing machines, air conditioners, rice cookers, vacuum cleaners, and induction heating (IH) cooking heaters, c) health home appliances such as tooth brushes, blood pressure monitors, and body composition meters, and d) beauty home appliances such as dryers and shavers. In the present embodiment, description is provided based on a case where the communication apparatus 10 is a washing machine.

The external terminal 20 is a mobile terminal such as a featurephone, smartphone, and tablet, for example.

The communication apparatus 10 and the external terminal 20 can communicate using proximity wireless communication. The proximity wireless communication is a communication through a radio frequency identification (RFID) tag using a 13.56 MHz band (HF band) of the electromagnetic induction or a 52 to 954 MHz band (UHF band) of radio wave, and a near field communication (NFC: ISO/IEC 21481) of a 13.56 MHz band for example. In general, the communication is limited within the distance of 10 cm for the case of HF band, and within several cm for the case of UHF band. Thus, holding (touching) the external terminal 20 over (to) the communication apparatus 10 establishes proximity wireless communication between the communication apparatus 10 and the external terminal 20.

In the present embodiment, description is provided on a case where the external terminal 20 has the reader-writer function and the communication apparatus 10 has the IC tag function. It is to be noted that the case of vise versa is also possible, that is, the external terminal 20 may have the IC tag function and the communication apparatus 10 may have the reader-writer function.

The server 30 is a web server including a database. The server 30 is connected to the external terminal 20 via the Internet 40. The server 30 registers the information transmitted from the external terminal 20 via the Internet 40, and transfers the information indicating the result to the external terminal 20 via the Internet 40.

Structure of the Communication Apparatus

Figure 2:
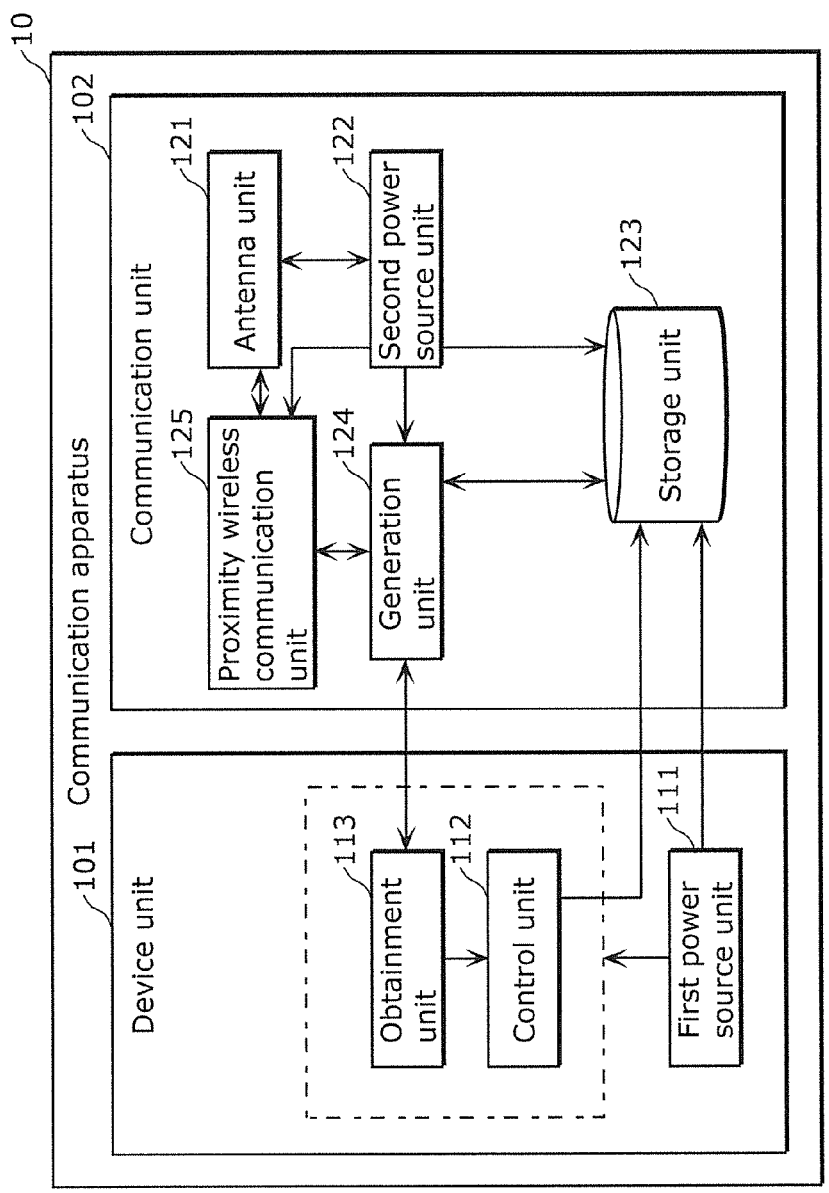
FIG. 2 is a block diagram illustrating a functional structure of the communication apparatus according to Embodiment 1.

FIG. 2 is a block diagram illustrating a functional structure of the communication apparatus 10 according to Embodiment 1. The communication apparatus 10 in the drawing includes a device unit 101 and a communication unit 102.

The device unit 101 includes a first power source unit 111, a control unit 112, and an obtainment unit 113.

The first power source unit 111 is a main power source of the communication apparatus 10. When the first power source unit 111 is ON, power (included in first power) from the first power source unit 111 is supplied to the entire communication apparatus 10. When the first power source unit 111 is OFF, supply of power to the entire communication apparatus 10 is stopped.

The control unit 112 controls the operation of the communication apparatus 10. The control unit 112 issues an instruction of "start wash operation" using a user operation, etc. as a trigger, for example. Upon receiving this instruction, the communication apparatus 10 starts a wash operation. Furthermore, the control unit 112 transmits the operation history information indicating the operation status of the communication apparatus 10 which the control unit 112 has controlled (that is the past operation status) to the storage unit 123 (described later) of the communication unit 102, every time the control unit 112 controls operation of the communication apparatus 10. Examples of the operation status of the communication apparatus 10 include a status in which the washing machine is powered OFF, wash operation is started, and dry operation is started.

The obtainment unit 113 obtains the operation status information indicating the current operation status of the communication apparatus 10 controlled by the control unit 112. For example, when the communication apparatus 10 is in the wash operation, the obtainment unit 113 obtains the operation status information indicating the wash operation status. The obtainment unit 113 obtains the operation status information when requested by the generation unit 124 (described later) of the communication unit 102. It is to be noted that the obtainment unit 113 may obtain the operation status information regularly at a given time interval (at intervals of 10 seconds, for example).

The communication unit 102 includes an antenna unit 121, a second power source unit 122, a storage unit 123, a generation unit 124, and a proximity wireless communication unit 125.

The antenna unit 121 is an antenna for performing proximity wireless communication with the external terminal 20, and transmits and receives radio waves to and from the external terminal 20.

The second power source unit 122 generates power by electromagnetic induction based on the radio wave received at the antenna unit 121. The second power source unit 122 supplies power (included in a second power) to each of the storage unit 123, the generation unit 124, and the proximity wireless communication unit 125, while receiving the radio wave from the external terminal 20 at the antenna unit 121 and for a while after the reception. This allows proximity wireless communication between the communication apparatus 10 and the external terminal 20 even when the first power source unit 111 that is the main power source is OFF.

Figure 3:
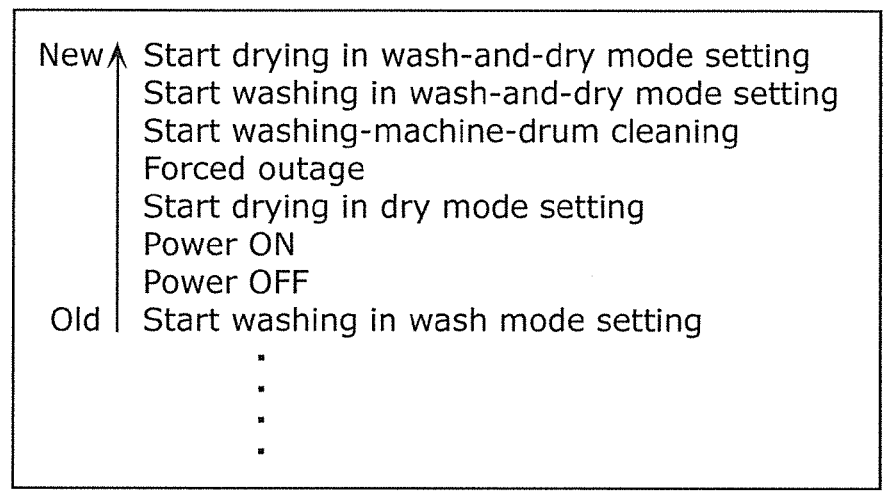
FIG. 3 illustrates an example of operation history information stored in a storage unit.

The storage unit 123 is a memory capable of storing data, and is a random access memory (RAM) and a non-volatile memory, for example. The storage unit 123 stores a plurality of operation history information items transmitted from the control unit 112. FIG. 3 is an example of the operation history information items stored in the storage unit 123. As shown in FIG. 3, the storage unit 123 stores a plurality of operation history information items in a series of time axis. Examples of the operation history information items include (1) "start drying in wash-and-dry mode setting", (2) "start washing in wash-and-dry mode setting", and (3) "start washing-machine-drum cleaning". The storage unit 123 stores the past week's worth of operation history information items, for example. The operation history information may be stored in the storage unit 123 in any manner. For example, character strings associated with the operation history information may be stored as the operation history information.

When power is supplied from the second power source unit 122, the generation unit 124 generates a command for controlling the external terminal 20. Specifically, when power from the first power source unit 111 is supplied to the obtainment unit 113 (that is the communication apparatus 10), the generation unit 124 requests the obtainment unit 113 to obtain the operation status information, reads the operation history information from the storage unit 123, and generates a command (that is a first command) based on the operation status information and the operation history information. On the other hand, when power from the first power source unit 111 is not supplied to the obtainment unit 113 (that is the communication apparatus 10), the generation unit 124 reads the operation history information from the storage unit 123 and generates a command (that is a second command) based on the read operation history information. The command generated by the generation unit 124 is a command for causing a display unit 201 (described later) of the external terminal 20 to display screen information related to the operation status, etc. of the communication apparatus 10, for example. Here, the screen information to be displayed on the display unit 201 is information expected to be required by the user regarding the communication apparatus 10 and is displayed on the screen in the application that runs on the external terminal 20. Examples of such information include a wash mode setting screen, dry mode setting screen, and electricity expense display screen. The command is an instruction to the external terminal 20, and may be a program which can be executed by a virtual machine provided on the external terminal 20, for example.

The proximity wireless communication unit 125 performs proximity wireless communication with a proximity wireless communication unit 204 (described later) of the external terminal 20 via the antenna unit 121. When polling from the external terminal 20 is received at the IC tag (not shown) of the proximity wireless communication unit 125 with the communication apparatus 10 held over (touched to) the external terminal 20 by the user, proximity wireless communication is established between the communication apparatus 10 and the external terminal 20. The proximity wireless communication unit 125 transmits and receives data to and from the external terminal 20 at a time when proximity wireless communication is established. For example, the proximity wireless communication unit 125 transmits the command generated by the generation unit 124 to the external terminal 20.

Structure of the External Terminal

Figure 4:
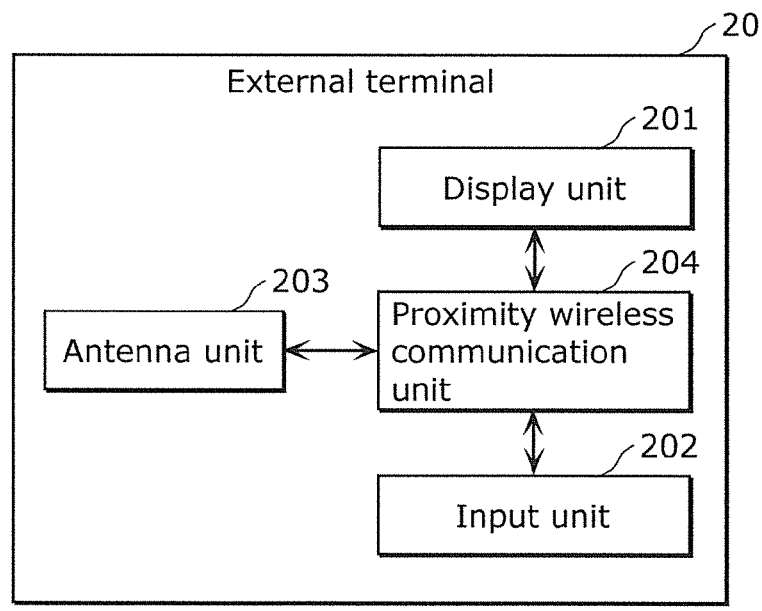
FIG. 4 is a block diagram illustrating a functional structure of an external terminal according to Embodiment 1.

FIG. 4 is a block diagram illustrating a functional structure of the external terminal 20 according to Embodiment 1. The external terminal 20 in the drawing includes a display unit 201, an input unit 202, an antenna unit 203, and a proximity wireless communication unit 204.

The display unit 201 is a liquid crystal display, for example. The display unit 201 displays the screen in the application that runs on the external terminal 20 and the data, etc. transmitted from the server 30, for example.

The input unit 202 is a user interface which accepts user operation, and is a numerical keypad, for example.

The antenna unit 203 is an antenna for performing proximity wireless communication with the communication apparatus 10, and transmits and receives radio waves to and from the communication apparatus 10.

The proximity wireless communication unit 204 performs proximity wireless communication with the proximity wireless communication unit 125 of the communication apparatus 10 via the antenna unit 203. Upon accepting the user operation at the input unit 202, the external terminal 20 starts polling to the IC tag of the communication apparatus 10. After that, the proximity wireless communication unit 125 receives polling via the antenna unit 121 by the user holding (touching) the communication apparatus 10 over (to) the external terminal 20. Here, polling to the IC tag of the communication apparatus 10 by the external terminal 20 may be started by the user operating the input unit 202 with holding (touching) the external terminal 20 over (to) the communication apparatus 10. When the polling is received at the IC tag of the communication apparatus 10, proximity wireless communication is established between the communication apparatus 10 and the external terminal 20. The proximity wireless communication unit 204 transmits and receives data to and from the external terminal 10 at a time when proximity wireless communication is established. For example, the proximity wireless communication unit 204 receives a command transmitted from the communication apparatus 10.

Method of Controlling the Communication Apparatus

Figure 5:
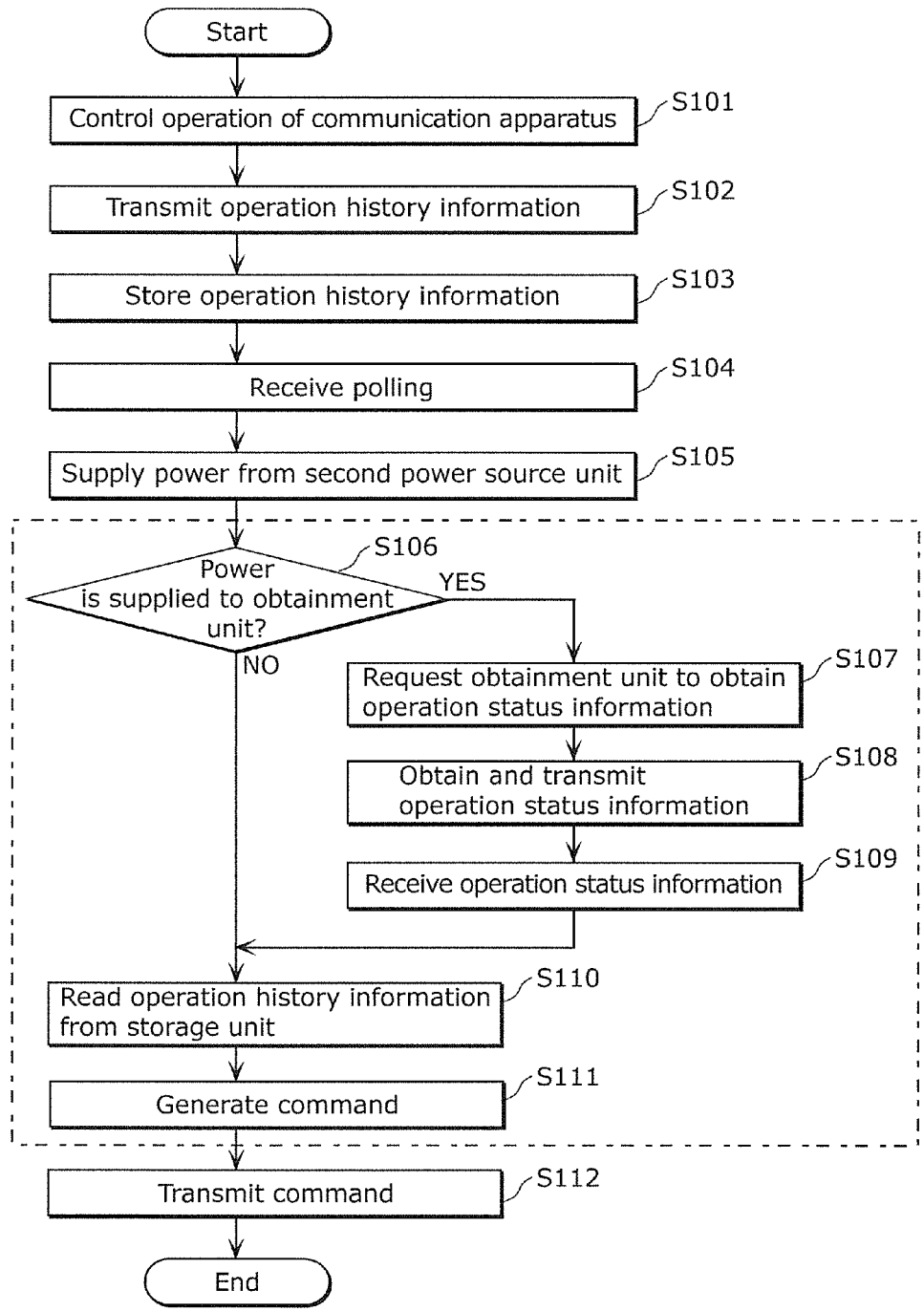
FIG. 5 is a flowchart illustrating a flow of control performed by the communication apparatus according to Embodiment 1.
Figure 6:
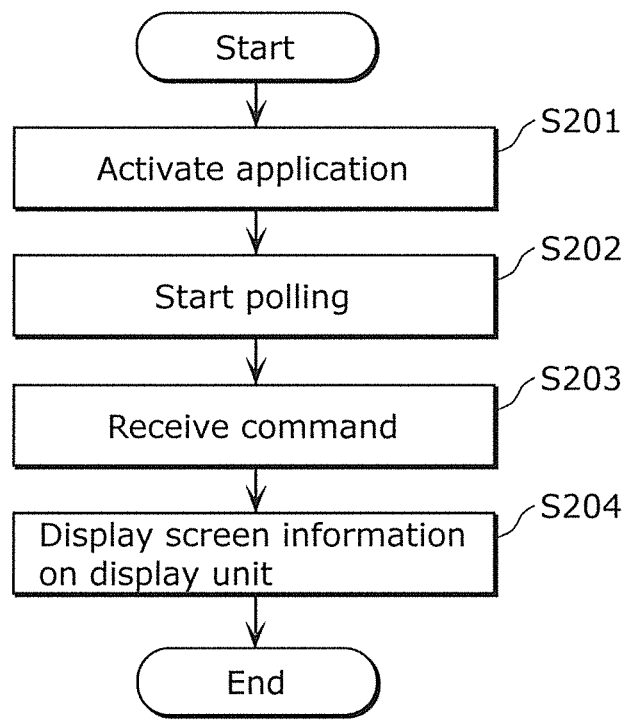
FIG. 6 is a flowchart illustrating a flow of control performed by the external terminal according to Embodiment 1.

Next, a method of controlling the above-described communication apparatus 10 is described with reference to FIG. 5 to FIG. 8. FIG. 5 is a flowchart illustrating a flow of control performed by the communication apparatus 10 according to Embodiment 1. FIG. 6 is a flowchart illustrating a flow of control performed by the external terminal 20 according to Embodiment 1.

First, the control unit 112 controls the operation of the communication apparatus 10 using the user operation, etc. as a trigger, for example (S101 in FIG. 5). The control unit 112 transmits the operation history information to the storage unit 123 when controlling the operation of the communication apparatus 10 (S102). The operation history information transmitted from the control unit 112 is stored in the storage unit 123 (S103).

When the user wants to know the information on the communication apparatus 10, the user activates using the input unit 202 the application installed on the external terminal 20 (S201 in FIG. 6). Then, the external terminal 20 starts polling to the IC tag of the communication apparatus 10 by the user operating a dedicated button provided in the application using the input unit 202 (S202). Then, polling is received at the IC tag of the communication apparatus 10 by the user holding (touching) the external terminal 20 over (to) the communication apparatus 10 (S104 in FIG. 5). Here, the second power source unit 122 generates power based on the radio wave obtained when polling is received, and supplies power to each of the storage unit 123, generation unit 124, and proximity wireless communication unit 125 (S105).

The generation unit 124 determines whether power from the first power source unit 111 is supplied to the obtainment unit 113 (S106). When determining that power from the first power source unit 111 is supplied to the obtainment unit 113 (YES in S106), the generation unit 124 requests the obtainment unit 113 to obtain the operation status information (S107). The obtainment unit 113 obtains the operation status information in response to the request from the generation unit 124, and transmits the obtained operation status information to the generation unit 124 (S108). The generation unit 124 receives the operation status information from the obtainment unit 113 (S109), and reads the operation history information from the storage unit 123 (S110). The generation unit 124 generates a command based on the operation status information and the operation history information (S111).

On the other hand, when determining that power from the first power source unit 111 is not supplied to the obtainment unit 113 (NO in S106), the generation unit 124 reads the operation history information from the storage unit 123 (S110), and generates a command based on the read operation history information (S111).

The proximity wireless communication unit 125 of the communication apparatus 10 transmits the command generated by the generation unit 124 to the external terminal 20 (S112). The proximity wireless communication unit 204 of the external terminal 20 receives the command transmitted from the communication apparatus 10 (S203 in FIG. 6). The display unit 201 of the external terminal 20 displays the screen information (wash mode setting screen for example) based on the received command (S204).

Figure 7:
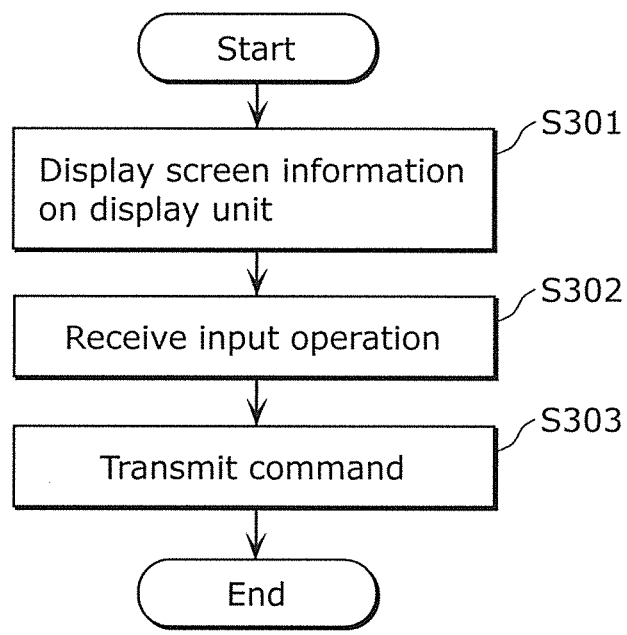
FIG. 7 is a flowchart illustrating a flow of control performed by the external terminal according to Embodiment 1.
Figure 8:
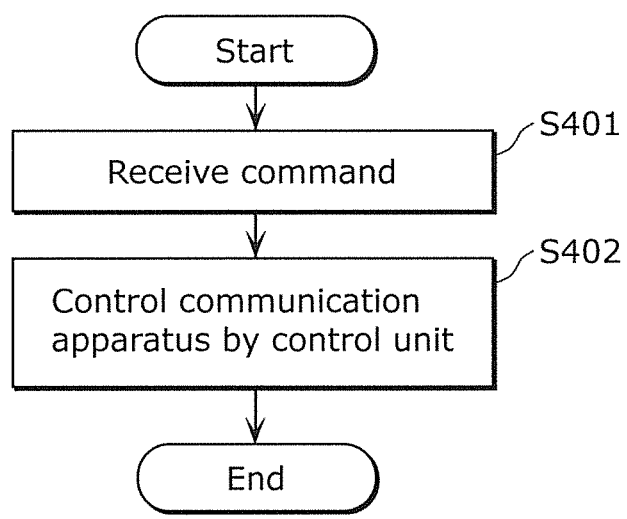
FIG. 8 is a flowchart illustrating a flow of control performed by the communication apparatus according to Embodiment 1.

The above has described the flow of control performed until the screen information is displayed on the display unit 201. Next, an example of the flow of subsequent control is described with reference to FIG. 7 and FIG. 8. FIG. 7 is a flowchart illustrating a flow of control performed by the external terminal 20 according to Embodiment 1. FIG. 8 is a flowchart illustrating a flow of control performed by the communication apparatus 10 according to Embodiment 1.

For example, when the wash mode setting screen is displayed on the display unit 201 (S301 in FIG. 7), the user operates the input unit 202. By the input unit 202 accepting this operation (S302), "start washing" is set in the wash mode setting screen. With this, the proximity wireless communication unit 204 of the external terminal 20 transmits the command for causing the communication apparatus 10 to start washing operation to the communication apparatus 10 (S303).

The proximity wireless communication unit 125 of the communication apparatus 10 receives the command from the external terminal 20 (S401 in FIG. 8). With this, the control unit 112 causes the communication apparatus 10 to start wash operation (S402).

Command Generation Scheme

Next, an example of a command generation scheme used by the generation unit 124 is described with reference to FIG. 9. FIG. 9 is a flowchart illustrating a flow of the command generation scheme according to Embodiment 1. It is to be noted that FIG. 9 is a flowchart illustrating a more specific example of each step enclosed with the dashed line in the flowchart in FIG. 5.

First, the generation unit 124 determines whether power from the first power source unit 111 is supplied to the obtainment unit 113 (S501). When determining that power from the first power source unit 111 is not supplied to the obtainment unit 113 (NO in S501), the generation unit 124 reads the operation history information from the storage unit 123, and generates a command based on the read operation history information. Specifically, the generation unit 124 obtains the last wash mode from the read operation history information, and generates a command for causing the display unit 201 to display the last wash mode (S502). Examples of the wash mode include a "quick wash mode" for washing in a short time and a "thorough wash mode" for washing thoroughly. When the first power source unit 111 is OFF as above, the user is likely to want to know the last wash mode. Thus, generating the above-described command allows the user to obtain information he/she needs on the communication apparatus 10. It is to be noted that causing the display unit 201 to display not only the last wash mode but also electricity expense and an amount of water used for the wash mode is an option.

On the other hand, when determining that power from the first power source unit 111 is supplied to the obtainment unit 113 (YES in S501), the generation unit 124 obtains the operation status information from the obtainment unit 113. The generation unit 124 determines the current operation status of the communication apparatus 10 based on the obtained operation status information (S503).

When the current operation status of the communication apparatus 10 is "drying", the generation unit 124 generates a command for causing the display unit 201 to display a dry time setting change screen (S504). Examples of the dry time setting change screen include a screen on which a character string saying "Extend the dry operation for how many minutes?" or "Stop dry operation?" is displayed. When the current operation status of the communication apparatus 10 is "drying" as above, the user is likely to want to change the setting of the drying time. Thus, generating the above-described command allows the user to perform operation he/she needs regarding the communication apparatus 10.

When the current operation status of the communication apparatus 10 is "washing", the generation unit 124 generates a command for causing the display unit 201 to display a wash mode setting change screen (S505). The wash mode setting change screen is a screen through which the user changes the setting on the wash mode. Examples of the wash mode setting change screen include a screen for changing the setting from the "wash only" wash mode to "wash and dry" wash mode, and a screen for changing the setting from "rinse 2 times" to "rinse 3 times". When the current operation status of the communication apparatus 10 is "washing" as above, the user is likely to want to change the setting on the wash mode. Thus, generating the above-described command allows the user to perform the operation he/she needs regarding the communication apparatus 10.

When the current operation status of the communication apparatus 10 is "operation stopped", the generation unit 124 obtains the latest operation status of the communication apparatus 10 from the read operation history information (S506). When the latest operation status is "wash operation", the generation unit 124 generates a command for causing the display unit 201 to display the last wash mode (S507). When the latest operation status is "wash operation" as above, the user is likely to want to know the last wash mode. Thus, generating the above-described command allows the user to obtain information he/she needs regarding the communication apparatus 10.

On the other hand, when the latest operation status is "power ON", the generation unit 124 generates a command for causing the display unit 201 to display a wash mode setting screen (S508). It is to be noted that the wash mode setting screen is a screen through which the user sets the wash mode. When the latest operation status is "power ON" as above, the user is likely to want to execute the wash operation. Thus, generating the above-described command allows the user to perform the operation he/she needs regarding the communication apparatus 10.

The above has described an example of the command generation scheme. The branch conditions and the content of the command in FIG. 9 are not specifically limited, and various branch conditions and command content may be adopted.

Advantageous Effect

As it has been described, the generation unit 124 generates a command based on the operation status information and the operation history information (or based only on the operation history information). With this, the screen generated based on the above command can be displayed in the application that runs in the external terminal 20. This significantly reduces the time it takes for and the number of operations performed by a user to obtain the target information, which relieves the stress of the user. Furthermore, even when the first power source unit 111 is OFF, the generation unit 124 can generate the command based on the operation history information stored in the storage unit 123.

Modification of Embodiment 1

Description is provided on a command generation scheme according to a modification of Embodiment 1 with reference to FIG. 10. FIG. 10 is a flowchart illustrating a flow of the command generation scheme according to the modification of Embodiment 1. In the present modification, steps S509 to S513 are added to the steps S501 to S508 in the command generation scheme according to Embodiment 1 above. In FIG. 10, steps which are the same as those in FIG. 9 are assigned with the same numbers as in FIG. 9 and the description is omitted.

In the present modification, when determining that power from the first power source unit 111 is not supplied to the obtainment unit 113 (NO in S501), the generation unit 124 reads the operation history information from the storage unit 123. The generation unit 124 determines whether the washing machine drum has been cleaned during the past month, based on the read operation history information (S509). When determining that the washing machine drum has not been cleaned during the past month (NO in S509), the generation unit 124 generates a command for causing the display unit 201 to display a screen for recommending the user to clean the washing machine drum (S510).

In S509, the generation unit 124 may determine whether the washing machine drum has been cleaned once in every five wash operations, for example. The frequency of the washing-machine-drum cleaning used in the determination is the frequency defined by the manufacturer of the communication apparatus 10, for example.

When determining that the washing machine drum has been cleaned during the past month (YES in S509), the generation unit 124 determines whether the operation status immediately before the communication apparatus 10 is powered OFF is dry operation, based on the read operation history information (S511). When determining that the operation status immediately before being powered OFF is dry operation (YES in S511), the generation unit 124 generates a command for causing the display unit 201 to display a screen for recommending the user to clean the filter (S512). When determining that the operation status immediately before being powered OFF is not dry operation (NO in S511), the generation unit 124 generates a command for causing the display unit 201 to display the last wash mode (S502).

Furthermore, in the present modification, when determining in S506 that the latest operation status is "dry operation", the generation unit 124 generates a command for causing the display unit 201 to display the screen for recommending the user to clean the filter (S513).

As described above, in the present modification, the information recommending filter cleaning, etc. to the user is also included in the information expected to be needed by the user regarding the communication apparatus 10.

It is to be noted that the generation unit 124 may generate commands using various command generation schemes. FIG. 11 illustrates a table of a database for generating the command. For example, as shown in FIG. 11, the generation unit 124 can hold a table (chart) and generate a command based on the table. The table has a combination of parameters and a corresponding command to be generated. The parameters include the power supply status of the first power source unit 111, the current operation status of the communication apparatus 10, and the past operation status of the communication apparatus 10. Alternatively, the generation unit 124 can generate commands based on algorithms such as a decision tree.

Embodiment 2

Structure of the Communication Apparatus

Figure 12:
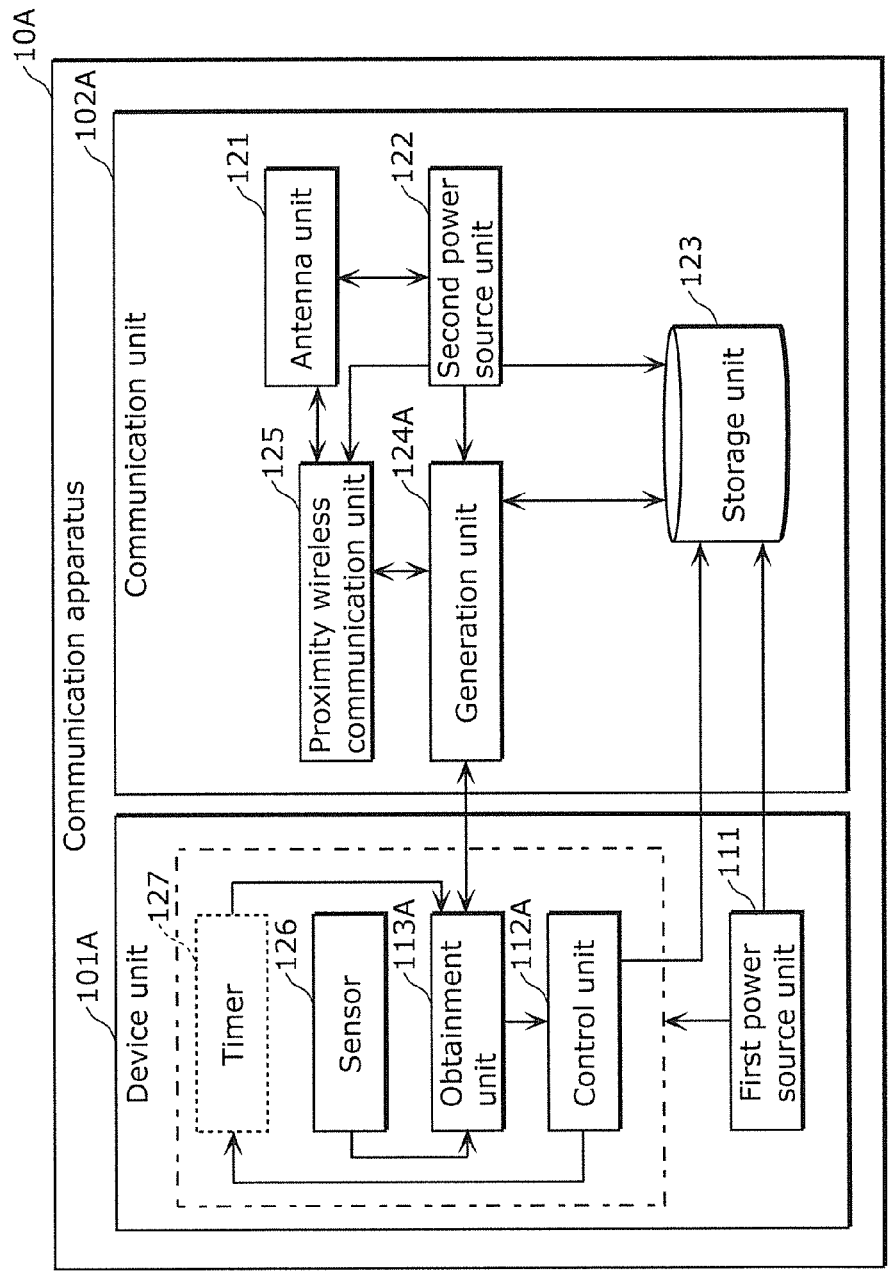
FIG. 12 is a block diagram illustrating a functional structure of a communication apparatus according to Embodiment 2.

Next, description is provided on a structure of a communication apparatus 10A according to Embodiment 2, with reference to FIG. 12. FIG. 12 is a block diagram illustrating a functional structure of the communication apparatus 10A according to Embodiment 2. In each of the embodiments below, the constituent elements which are the same as those in Embodiment 1 above are assigned with the same reference signs, and description is omitted.

In the present embodiment, a device unit 101A of the communication apparatus 10A further includes a sensor 126 and a timer 127.

The sensor 126 detects a value related to the communication apparatus 10A. Examples of the sensor 126 include a sensor which detects the weight of laundry in the washing machine drum, a sensor which detects the opening and closing of the lid, and a sensor which detects clogging of the filter. In the present embodiment, description is provided on the case where the sensor 126 is the sensor which detects the weight of laundry in the washing machine drum.

The timer 127 measures the elapsed time from a time of a change in the value detected by the sensor 126 (hereinafter referred to as "value of the sensor 126").

The control unit 112A receives the value of the sensor 126 transmitted from the obtainment unit 113A. The control unit 112A activates (restarts) the timer 127 at a time of a change from the value of the sensor 126 received last time to the value of the sensor 126 received this time. In the case where the value of the sensor 126 further changes after the activation of the timer 127, the control unit 112A resets the timer 127, and then restarts the timer 127. The time of a change in the value of the sensor 126 indicates the time of a change in the weight of the laundry in the washing machine drum, such as when some laundry is put into the washing machine drum, or when the laundry is taken out from the washing machine drum.

The obtainment unit 113A obtains the operation status information, the value of the sensor 126, and the time period measured by the timer 127 (hereinafter referred to as "value of the timer 127"), when requested by the generation unit 124A. Upon obtaining the value of the sensor 126, the obtainment unit 113A transmits the value of the sensor 126 to the control unit 112A. When obtaining the value of the sensor 126, the obtainment unit 113A obtains at least two values of the sensor 126 in association with the current operation status of the communication apparatus 10. The at least two values include the value of the sensor 126 obtained this time and that obtained last time. It is to be noted that the obtainment unit 113A may obtain the operation status information, the value of the sensor 126, and the value of the timer 127, regularly at a given time interval (at intervals of five seconds, for example).

When power from the second power source unit 122 is supplied, the generation unit 124A generates a command for controlling the external terminal 20 (see FIG. 1). Specifically, when power from the first power source unit 111 is supplied to the obtainment unit 113A, the generation unit 124A: requests the obtainment unit 113A to obtain the operation status information, the value of the sensor 126, and the value of the timer 127; reads the operation history information from the storage unit 123; and generates a command based on the operation status information, the value of the sensor 126, the value of the timer 127, and the operation history information. On the other hand, when power from the first power source unit 111 is not supplied to the obtainment unit 113A, the generation unit 124A reads the operation history information from the storage unit 123 and generates a command based on the read operation history information.

Method of Controlling the Communication Apparatus

Figure 13:
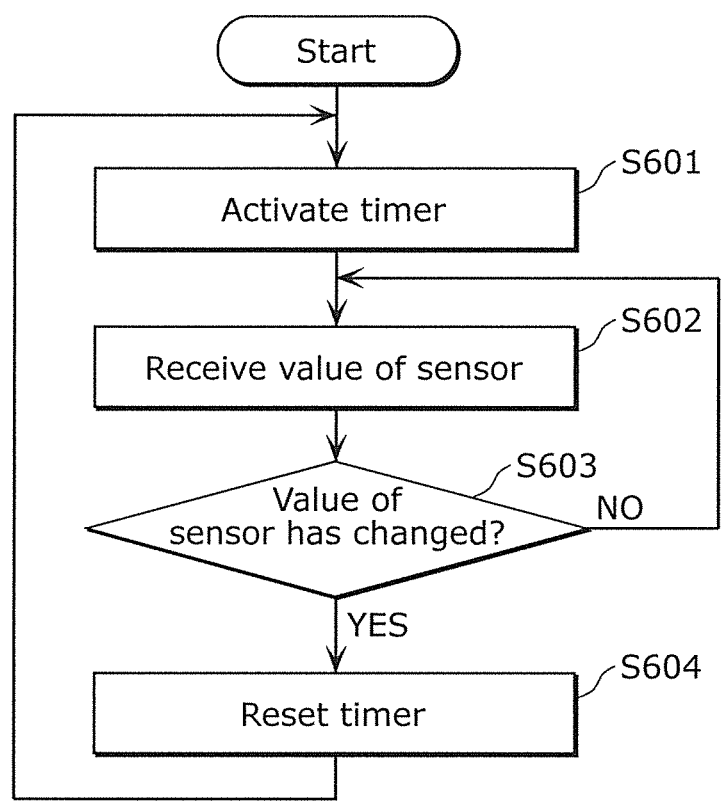
FIG. 13 is a flowchart illustrating a flow of control performed by the communication apparatus according to Embodiment 2.
Figure 14:
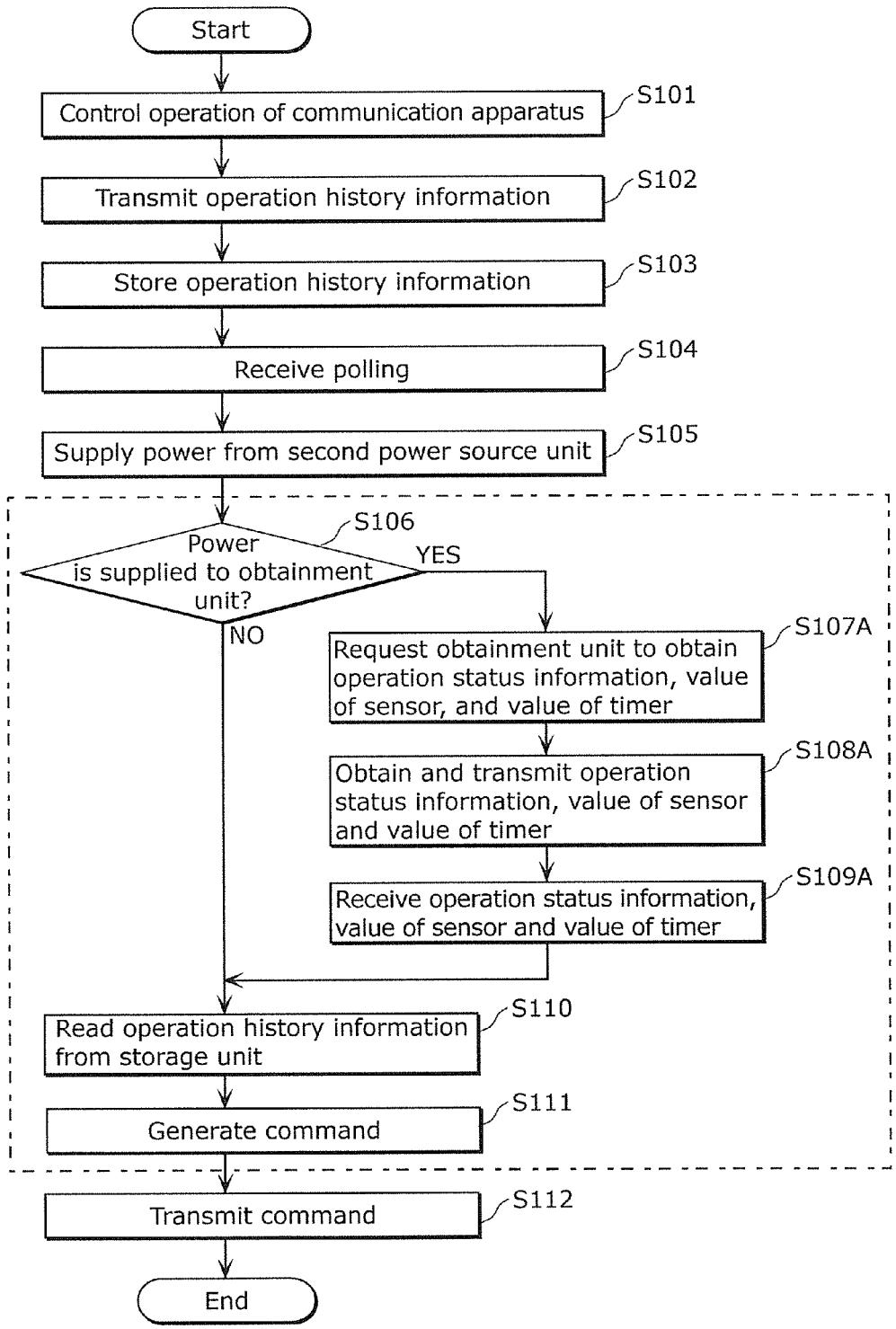
FIG. 14 is a flowchart illustrating a flow of control performed by the communication apparatus according to Embodiment 2.

Next, a method of controlling the above-described communication apparatus 10A is described with reference to FIG. 13 and FIG. 14. Each of FIG. 13 and FIG. 14 is a flowchart illustrating a flow of control performed by the communication apparatus 10A according to Embodiment 2. In the flowchart in FIG. 14, steps which are the same as those in FIG. 5 are assigned with the same numbers as in FIG. 5, and the description is omitted. The flowchart illustrating the flow of control performed by the external terminal 20 in the present embodiment is the same as that in FIG. 6 in Embodiment 1, and thus is not shown.

As shown in FIG. 13, first, the control unit 112A activates the timer 127 (S601). Then, the control unit 112A receives the value of the sensor 126 (S602), and when the value of the sensor 126 received this time has changed from the value of the sensor 126 received last time (YES in S603), the control unit 112A resets the timer 127 (S604), and then restarts the timer 127 (S601). In S603, when the value of the sensor 126 received this time has not changed from the value of the sensor 126 received last time (NO in S603), the control unit 112A does not reset the timer 127 and continues receiving the value of the sensor 126 (S602). As described above, the timer 127 constantly measures the time while repeating activation and resetting.

As shown in FIG. 14, first, steps S101 to S106 are executed in the same manner as in Embodiment 1. In S106, when determining that power from the first power source unit 111 is supplied to the obtainment unit 113A (YES in S106), the generation unit 124A requests the obtainment unit 113A to obtain the operation status information, the value of the sensor 126, and the value of the timer 127 (S107A). In response to the request from the generation unit 124A, the obtainment unit 113A: obtains the operation status information, the value of the sensor 126, and the value of the timer 127; and transmits the obtained operation status information, the value of the sensor 126, and the value of the timer 127 to the generation unit 124A (S108A). The generation unit 124A receives the operation status information, the value of the sensor 126, and the value of the timer 127 transmitted from the obtainment unit 113A (S109A), and further reads the operation history information from the storage unit 123 (S110). The generation unit 124 generates a command based on the operation status information, the value of the sensor 126, the value of the timer 127, and the operation history information (S111). When determining that power from the first power source unit 111 is not supplied to the obtainment unit 113A (NO in S106), the same process as in Embodiment 1 above is executed.

Although the generation unit 124A requests the obtainment unit 113A to obtain the value of the sensor 126 and the value of the timer 127 in the present embodiment, it is also possible to receive the value of the sensor 126 and the value of the timer 127 directly from the sensor 126 and the timer 127, respectively.

Command Generation Scheme

Figure 15:
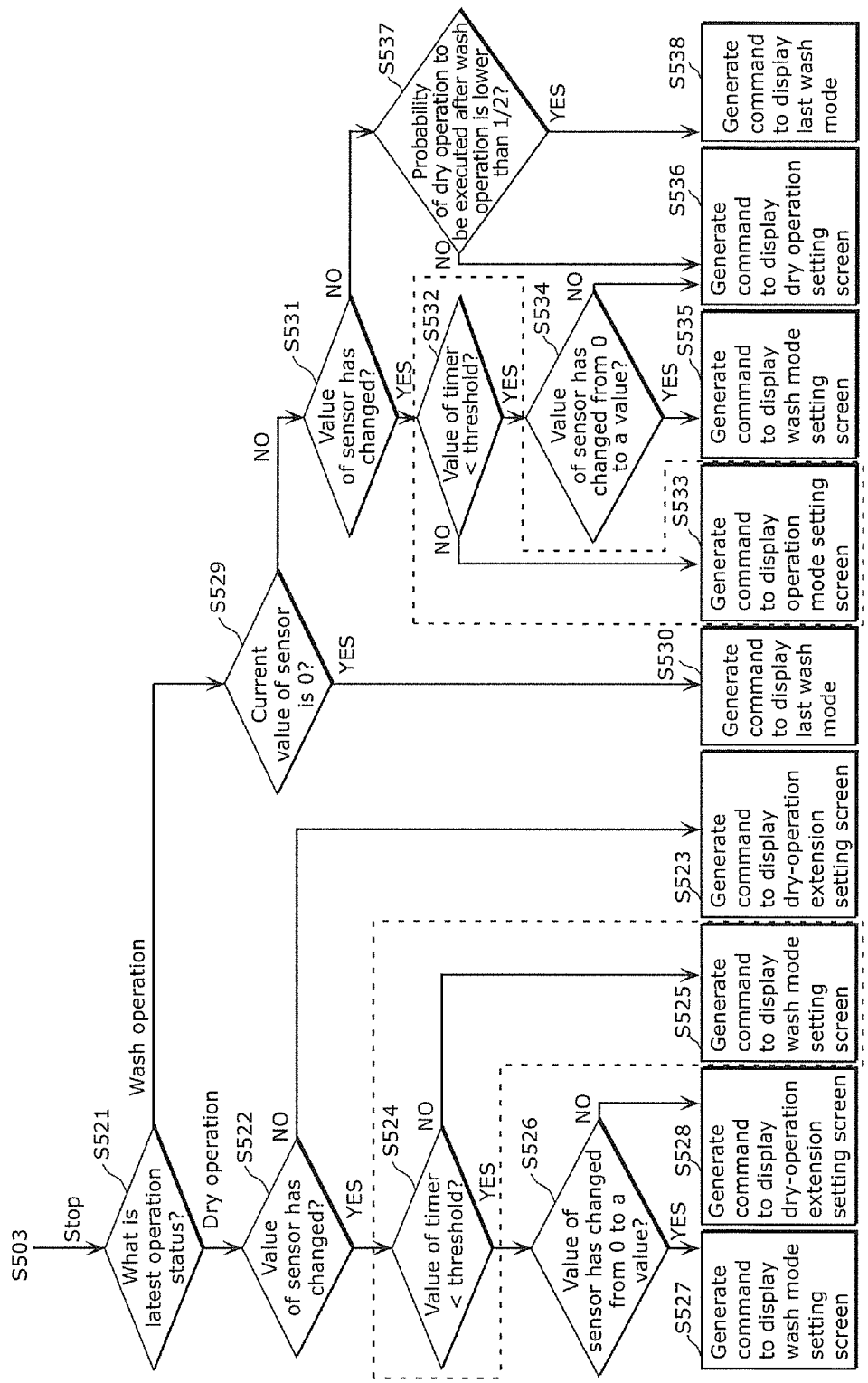
FIG. 15 is a flowchart illustrating a command generation scheme according to Embodiment 2.

Next, an example of a command generation scheme used by the generation unit 124A is described with reference to FIG. 15. FIG. 15 is a flowchart illustrating a flow of the command generation scheme according to Embodiment 2. It is to be noted that FIG. 15 is a flowchart illustrating a more specific example of each step enclosed with the dashed line in the flowchart in FIG. 14.

In the present embodiment, steps S501 to S505 are the same as those in FIG. 9 of Embodiment 1 above, and steps S506 and the subsequent steps are different. Thus, in the present embodiment, steps S501 to S505 in FIG. 9 are not shown, and description is provided only on steps (S521 to S538) which are different from those in Embodiment 1 above.

When the current operation status of the communication apparatus 10 in S503 in FIG. 9 is "operation stopped", the generation unit 124 obtains the latest operation status of the communication apparatus 10A from the read operation history information (S521). When the latest operation status is "dry operation", the generation unit 124A determines whether the value of the sensor 126 has changed after the latest dry operation (S522). When determining that the value of the sensor 126 has not changed (NO in S522), the generation unit 124A generates a command for causing the display unit 201 (see FIG. 1) to display a dry-operation extension setting screen (S523). The case where the value of the sensor 126 has not changed is a case where no laundry is put into and taken out from the washing machine drum since the latest dry operation, for example. When the value of the sensor 126 has not changed as above, the laundry remains in the washing machine drum as it is since the latest dry operation, and thus the user is likely to want to extend the dry time. Thus, generating the above-described command allows the user to perform the operation he/she needs on the communication apparatus 10A.

On the other hand, when determining that the value of the sensor 126 has changed (YES in S522), the generation unit 124A determines whether the value of the timer 127 has exceeded a threshold (an hour, for example) (S524). The threshold is a value that the communication apparatus 10A has, and is a value set preliminarily by the manufacturer and so on of the communication apparatus 10A. The case where the value of the sensor 126 has changed is a case where laundry is put into and taken out from the washing machine drum since the latest dry operation, for example.

When determining that the value of the timer 127 has exceeded the threshold (NO in S524), the generation unit 124A generates a command for causing the display unit 201 to display an operation mode setting screen (S525). Examples of the operation mode setting screen include a screen through which the user sets the operation mode he/she wants out of operation modes such as the wash mode, dry mode, and wash-and-dry mode. When the value of the timer 127 has exceeded the threshold as above, a predetermined time corresponding to the threshold has elapsed after the laundry is put into or taken out from the washing machine drum since the latest dry operation, and thus the user is likely to want to newly execute the wash operation and so on. Thus, generating the above-described command allows the user to perform operation he/she needs on the communication apparatus 10A.

On the other hand, when determining that the value of the timer 127 has not exceeded the threshold (YES in S524), the generation unit 124A determines whether the value of the sensor 126 has changed from 0 to a value (S526). When determining that the value of the sensor 126 has changed from 0 to the value (YES in S526), the generation unit 124A generates a command for causing the display unit 201 to display the wash mode setting screen (S527). The case where the value of the sensor 126 has changed from 0 to a value is a case where laundry is put into an empty washing machine drum, for example. When the value of the sensor 126 has changed from 0 to a value as above, the predetermined time has not elapsed since the laundry is put into the empty washing machine drum, and thus the user is likely to want to execute the wash operation. Thus, generating the above-described command allows the user to perform the operation he/she needs on the communication apparatus 10A.

When determining that the value of the sensor 126 has not changed from 0 to the value (NO in S526), the generation unit 124A generates a command for causing the display unit 201 to display the dry-operation extension setting screen (S528). The case where the value of the sensor 126 has not changed from 0 to a value is a case where some of the laundry is taken out while other of the laundry remains in the washing machine drum, for example. When the value of the sensor 126 has not changed from 0 to a value as above, the predetermined time has not elapsed since some of the laundry is taken out from the washing machine drum. Thus, it can be inferred that some of the laundry that has not been dried completely is in the washing machine drum, and thus the user is likely to want to extend the dry operation. Thus, generating the above-described command allows the user to perform operation he/she needs on the communication apparatus 10.

In S521, when the last operation status is "wash operation", the generation unit 124A determines whether the current value of the sensor 126 is 0 (S529). When determining that the current value of the sensor 126 is 0 (YES in S529), the generation unit 124A generates a command for causing the display unit 201 to display the last wash mode (S530). The case where the current value of the sensor 126 is 0 is a case where currently no laundry remains in the washing machine drum. When the current value of the sensor 126 is 0 as above, no laundry has been put into the washing machine drum since the last wash operation, and thus the user is likely to want to know the last wash mode. Thus, generating the above-described command allows the user to obtain information he/she needs on the communication apparatus 10A.

When determining that the current value of the sensor 126 is not 0 (NO in S529), the generation unit 124A determines whether the value of the sensor 126 has changed since the latest wash operation (S531). When determining that the value of the sensor 126 has changed (YES in S531), the generation unit 124A determines whether the value of the timer 127 has exceeded the threshold (S532). When determining that the value of the timer 127 has exceeded the threshold (NO in S532), the generation unit 124A generates a command for causing the display unit 201 to display an operation mode setting screen (S533). When the value of the timer 127 has exceeded the threshold as above, a predetermined time corresponding to the threshold has elapsed after the laundry is put into or taken out from the washing machine drum since the latest dry operation, and thus the user is likely to want to newly execute the wash operation and so on. Thus, generating the above-described command allows the user to perform operation he/she needs on the communication apparatus 10A.

On the other hand, when determining that the value of the timer 127 has not exceeded the threshold (YES in S532), the generation unit 124A determines whether the value of the sensor 126 has changed from 0 to a value (S534). When determining that the value of the sensor 126 has changed from 0 to the value (YES in S534), the generation unit 124A generates a command for causing the display unit 201 to display the wash mode setting screen (S535). When the value of the sensor 126 has changed from 0 to a value as above, the predetermined time has not elapsed since the laundry has been put into the empty washing machine drum, and thus the user is likely to want to execute the wash operation. Thus, generating the above-described command allows the user to perform the operation he/she needs regarding the communication apparatus 10A.

When determining that the value of the sensor 126 has not changed from 0 to the value (NO in S534), the generation unit 124A generates a command for causing the display unit 201 to display the dry operation setting screen (S536). The case where the value of the sensor 126 has not changed from 0 to a value is a case where some of the laundry is taken out while other of the laundry remains in the washing machine drum, for example. When the value of the sensor 126 has not changed from 0 to a value as above, the predetermined time has not elapsed since some of the laundry has been taken out from the washing machine drum. Thus, it can be inferred that some of the laundry that has not been dried completely is in the washing machine drum, and thus the user is likely to want to execute the dry operation. Generating the above-described command allows the user to perform the operation he/she needs on the communication apparatus 10A.

In S531, when determining that the value of the sensor 126 has not changed (NO in S531), the generation unit 124A calculates the probability of the dry operation to be executed after the wash operation based on the operation history information, and determines whether the probability is lower than a predetermined probability (½, for example) (S537). This probability can be calculated based on the number of dry operations executed after the latest 10 wash operations extracted from the operation history information, for example. The predetermined probability is a value set preliminarily by the manufacturer and so on of the communication apparatus 10A.

When determining that the probability is lower than the predetermined probability (YES in S537), the generation unit 124A generates a command for causing the display unit 201 to display the last wash mode (S538). In this case, the user is less likely to execute the dry operation after the wash operation. Thus, generating the above-described command allows the user to obtain information he/she needs regarding the communication apparatus 10A.

On the other hand, when determining that the probability is higher than the predetermined probability (NO in S537), the generation unit 124A generates a command for causing the display unit 201 to display the dry operation setting screen (S536). The dry operation setting screen is a screen for causing the communication apparatus 10A to execute the dry operation. In this case, the user is likely to execute the dry operation after the wash operation. Thus, generating the above-described command allows the user to perform the operation he/she needs regarding the communication apparatus 10A.

As described above, in the present embodiment, the value of the sensor 126 and the value of the timer 127 are taken into account when generating a command, which allows the user to obtain the target information more accurately.

Although the device unit 101A includes the sensor 126 and the timer 127 in the present embodiment, the timer 127 may be omitted. In this case, in the command generation scheme described above, steps enclosed with the dashed line in FIG. 15 can be omitted. Alternatively, a plurality of the sensor 126 and the timer 127 may be provided.

When the latest operation status is "dry operation" in S521 above, the generation unit 124A may determine whether the current value of the sensor 126 is 0. When determining that the current value of the sensor 126 is 0, the generation unit 124A can generate a command for causing the display unit 201 to display the screen for recommending filter cleaning to the user, for example. On the other hand, when determining that the current value of the sensor 126 is not 0, the generation unit 124A executes S522 described above.

Embodiment 3

Structure of the Communication Apparatus

Figure 16:
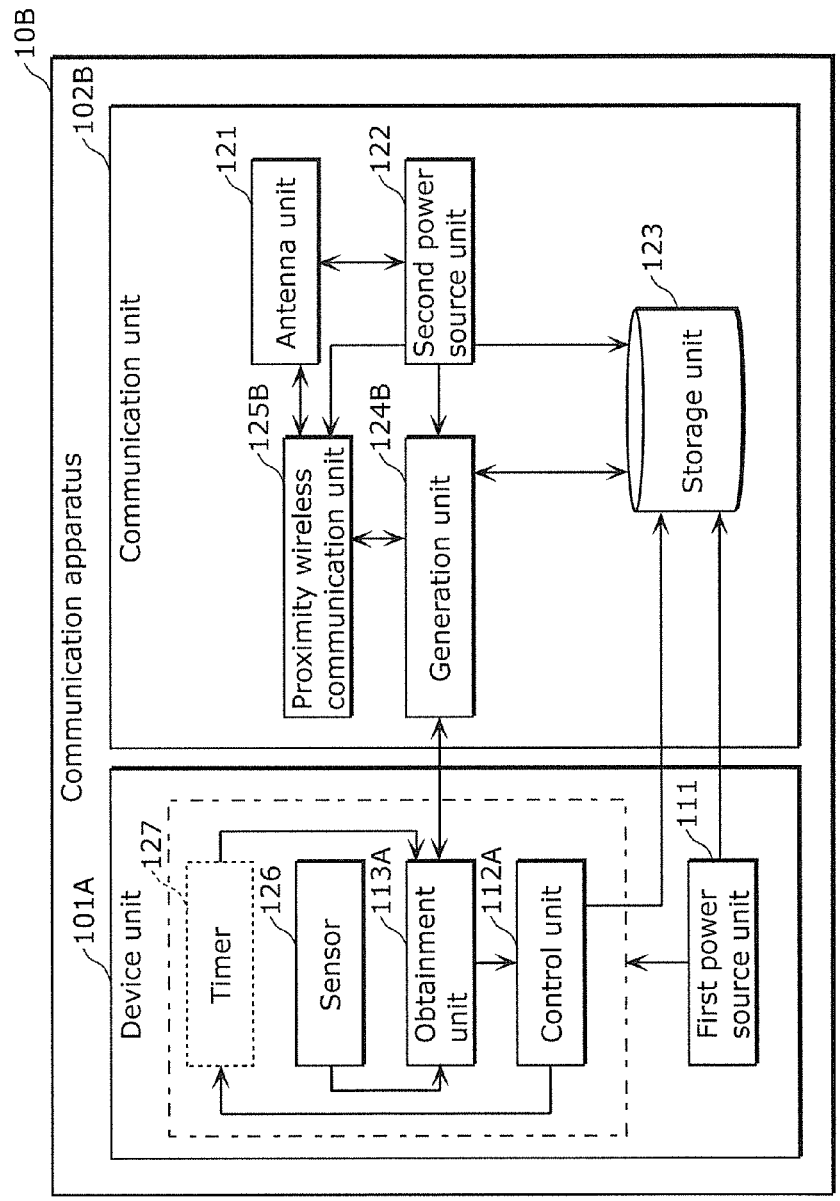
FIG. 16 is a block diagram illustrating a functional structure of a communication apparatus according to Embodiment 3.

FIG. 16 is a block diagram illustrating a functional structure of a communication apparatus 10B according to Embodiment 3. In the present embodiment, when proximity wireless communication is established between the communication apparatus 10B and an external terminal 20B, a proximity wireless communication unit 125B of the communication apparatus 10B requests a proximity wireless communication unit 204B of the external terminal 20B to transmit communication performance information. As a result, the proximity wireless communication unit 125B receives the communication performance information transmitted from the external terminal 20B. The communication performance information is information relating to the communication performance of the external terminal 20B, and is information indicating a communication speed of proximity wireless communication and an amount of data transmittable in one proximity wireless communication, for example.

Furthermore, when proximity wireless communication is established between the communication apparatus 10B and the external terminal 20B, the proximity wireless communication unit 125B obtains the operation history information from the generation unit 124B and transmits the obtained operation history information together with the command to the external terminal 20B. Here, the proximity wireless communication unit 125B sets the transmission amount of the operation history information based on the received communication performance information. For example, when the communication speed of the external terminal 20B is relatively high, the proximity wireless communication unit 125B increases the transmission amount of the operation history information, whereas the proximity wireless communication unit 125B reduces the transmission amount of the operation history information when the communication speed of the external terminal 20B is relatively low. The transmission amount is an amount of data transmittable in one proximity wireless communication.

Structure of the External Terminal

Figure 17:
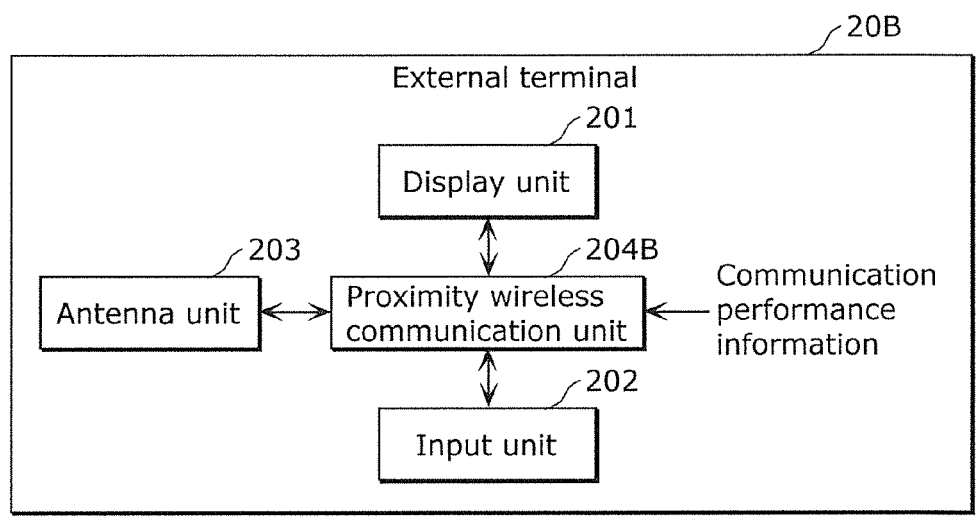
FIG. 17 is a block diagram illustrating a functional structure of an external terminal according to Embodiment 3.

FIG. 17 is a block diagram illustrating a functional structure of the external terminal 20B according to Embodiment 3. In the present embodiment, when the communication performance information transmission request from the communication apparatus 10B is received, the proximity wireless communication unit 204B of the external terminal 20B transmits the communication performance information to the communication apparatus 10B. The proximity wireless communication unit 204B may obtain the communication performance information stored in a memory of the external terminal 20B, or obtain the communication performance information from a server 30 via the Internet 40, for example.

Method of Controlling the Communication Apparatus

Figure 18:
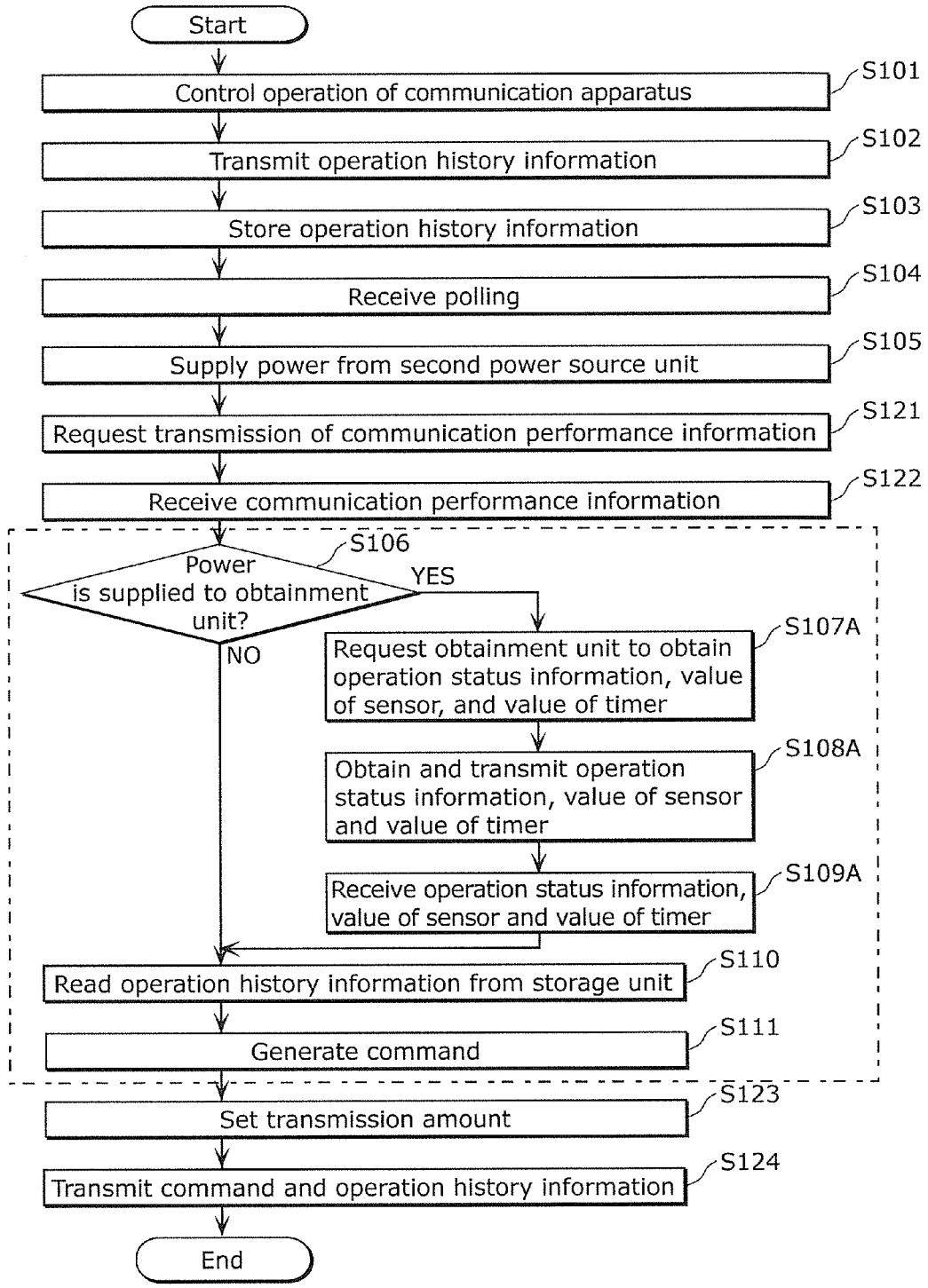
FIG. 18 is a flowchart illustrating a flow of control performed by the communication apparatus according to Embodiment 3.
Figure 19:
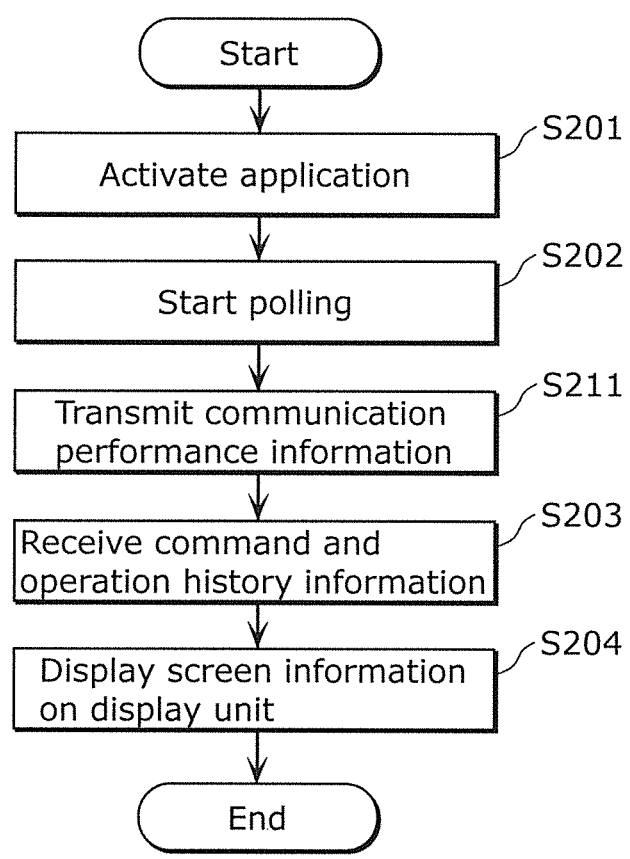
FIG. 19 is a flowchart illustrating a flow of control performed by the external terminal according to Embodiment 3.

FIG. 18 is a flowchart illustrating a flow of control performed by the communication apparatus 10B according to Embodiment 3. FIG. 19 is a flowchart illustrating a flow of control performed by the external terminal 20B according to Embodiment 3. In the flowchart in FIG. 18, steps which are the same as those in FIG. 14 are assigned with the same numbers and the description is omitted. In the flowchart in FIG. 19, steps which are the same as those in FIG. 6 are assigned with the same numbers and the description is omitted.

First, in the same manner as in Embodiment 2 above, steps S101 to S105 are executed, and then the proximity wireless communication unit 125B of the communication apparatus 10B requests the proximity wireless communication unit 204B of the external terminal 20B to transmit the communication performance information (S121 in FIG. 18). In response to this request, the proximity wireless communication unit 204B of the external terminal 20B transmits the communication performance information to the communication apparatus 10B (S211 in FIG. 19). With this, the proximity wireless communication unit 125B of the communication apparatus 10B receives the communication performance information from the external terminal 20B (S122 in FIG. 18).

Then, steps S106 to S111 are executed in the same manner as in Embodiment 2. After the command is generated by the generation unit 124B (S111), the proximity wireless communication unit 125B of the communication apparatus 10B sets the transmission amount of the operation history information based on the received communication performance information (S123). Then, the proximity wireless communication unit 125B transmits the command to the external terminal 20B, together with transmitting the operation history information based on the set transmission amount to the external terminal 20B (S124). The proximity wireless communication unit 204B of the external terminal 20B receives the command and the operation history information transmitted from the communication apparatus 10B (S203 in FIG. 19). The display unit 201 of the external terminal 20B displays the screen information based on the received command and the operation history information (S204). The screen information displayed based on the operation history information is a screen of a list indicating the past week's worth of operation statuses of the communication apparatus 10B, for example.

As described above, in the present embodiment, the user is allowed to know the past operation status of the communication apparatus 10B through the external terminal 20B, which enhances the convenience. Furthermore, when transmitting the operation history information from the communication apparatus 10B to the external terminal 20B, the operation history information can be transmitted with the optimal transmission amount according to the communication performance of the external terminal 20B, which optimizes the transmission time.

Embodiment 4

In the present embodiment, description is provided based on a case where the communication apparatus 10 is a rice cooker. Since the structure and flow of control of the communication apparatus 10 and the external terminal 20 are the same as those in Embodiment 1 above, the description is omitted. It is to be noted that the communication apparatus 10 and the external terminal 20 are assigned with the same reference signs as those in FIG. 2 and FIG. 4.

Figure 20:
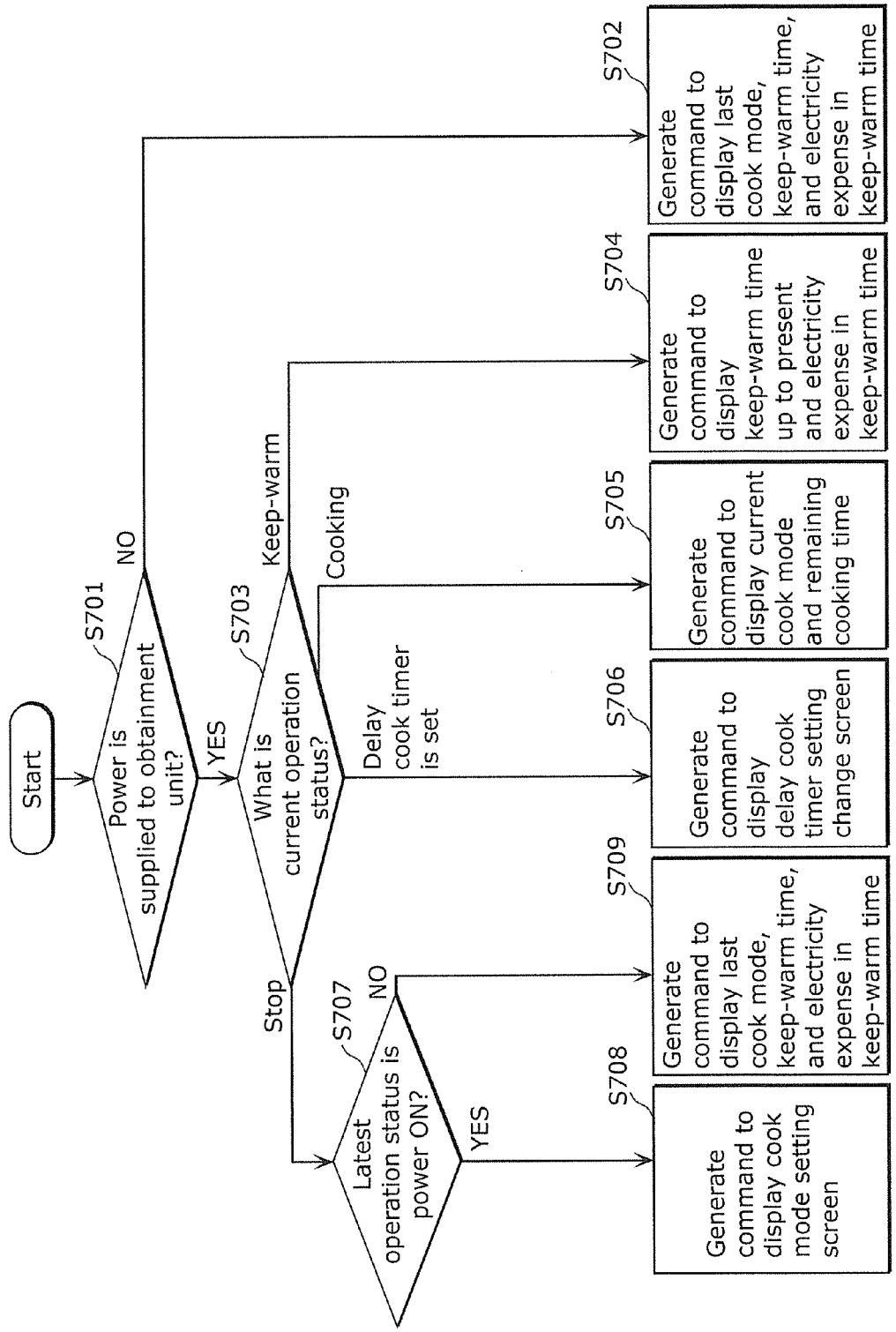
FIG. 20 is a flowchart illustrating a flow of a command generation scheme according to Embodiment 4.

An example of the command generation scheme used by the generation unit 124 in the present embodiment is described with reference to FIG. 20. FIG. 20 is a flowchart illustrating a flow of the command generation scheme according to Embodiment 4. It is to be noted that FIG. 20 is a flowchart illustrating a more specific example of each step enclosed with the dashed line in the flowchart in FIG. 5.

First, the generation unit 124 determines whether power from the first power source unit 111 is supplied to the obtainment unit 113 (S701). When determining that power from the first power source unit 111 is not supplied to the obtainment unit 113 (NO in S701), the generation unit 124 generates a command for causing the display unit 201 to display a type of the last cook mode, keep-warm time, and an electricity expense for keep-warm time (S702). Examples of the cook mode include "quick cook mode" for cooking in a short time and "white rice cook mode" for cooking white rice. When the communication apparatus 10 is powered OFF as above, the user is likely to want to know the last cook mode. Thus, generating the above-described command allows the user to obtain information he/she needs on the communication apparatus 10.

On the other hand, when determining that power from the first power source unit 111 is supplied to the obtainment unit 113 (YES in S701), the generation unit 124 obtains the operation status information from the obtainment unit 113. The generation unit 124 determines the current operation status of the communication apparatus 10 based on the obtained operation status information (S703).

When the current operation status of the communication apparatus 10 is "keep warm", the generation unit 124 generates a command for causing the display unit 201 to display the keep-warm time up to the present and the electricity expense for the keep-warm time (S704). When the rice cooker is in keep-warm operation as above, the user is likely to want to know the keep-warm time up to the present. Thus, generating the above-described command allows the user to obtain information he/she needs on the communication apparatus 10.

When the current operation status of the communication apparatus 10 is "cooking", the generation unit 124 generates a command for causing the display unit 201 to display the current cook mode and the remaining cooking time (S705). When the current operation status is cooking as above, the user is likely to want to know the current cook mode. Thus, generating the above-described command allows the user to obtain information he/she needs on the communication apparatus 10.

When the current operation status of the communication apparatus 10 is "delay cook timer is set", the generation unit 124 generates a command for causing the display unit 201 to display a delay cook timer setting change screen (S706). The delay cook timer setting change screen is a screen for changing a cooking finish time and the cook mode the delay cook timer is set for. When the current operation status is delay cook timer is set as above, the user is likely to want to change the cooking finish time, etc. Thus, generating the above-described command allows the user to perform operation he/she needs regarding the communication apparatus 10.

When the current operation status of the communication apparatus 10 is "stop", the generation unit 124 determines whether the latest operation status of the communication apparatus 10 is "power ON" based on the read operation history information (S707). When the latest operation status is "power ON" (YES in S707), the generation unit 124 generates a command for causing the display unit 201 to display a cook mode setting screen (S708). It is to be noted that the cook mode setting screen is a screen through which the user sets the cook mode. When the communication apparatus 10 is stopped immediately after being powered ON, the user is likely to want to cook rice. Thus, generating the above-described command allows the user to perform operation he/she needs on the communication apparatus 10.

On the other hand, when the latest operation status is not "power ON" (NO in S707), the generation unit 124 generates a command for causing the display unit 201 to display the last cook mode, keep-warm time, and electricity expense in the keep-warm time (S709). When the communication apparatus 10 is stopped immediately after being in the operation status other than "power ON" as above, the user is likely to want to know the last cook mode. Thus, generating the above-described command allows the user to obtain information he/she needs on the communication apparatus 10.

Embodiment 5

In the present embodiment, description is provided based on a case where the communication apparatus 10 is a microwave. Since the structure and flow of control of the communication apparatus 10 and the external terminal 20 are the same as those in Embodiment 1 above, description on them are omitted. It is to be noted that the communication apparatus 10 and the external terminal 20 are assigned with the same reference signs as those in FIG. 2 and FIG. 4.

Figure 21:
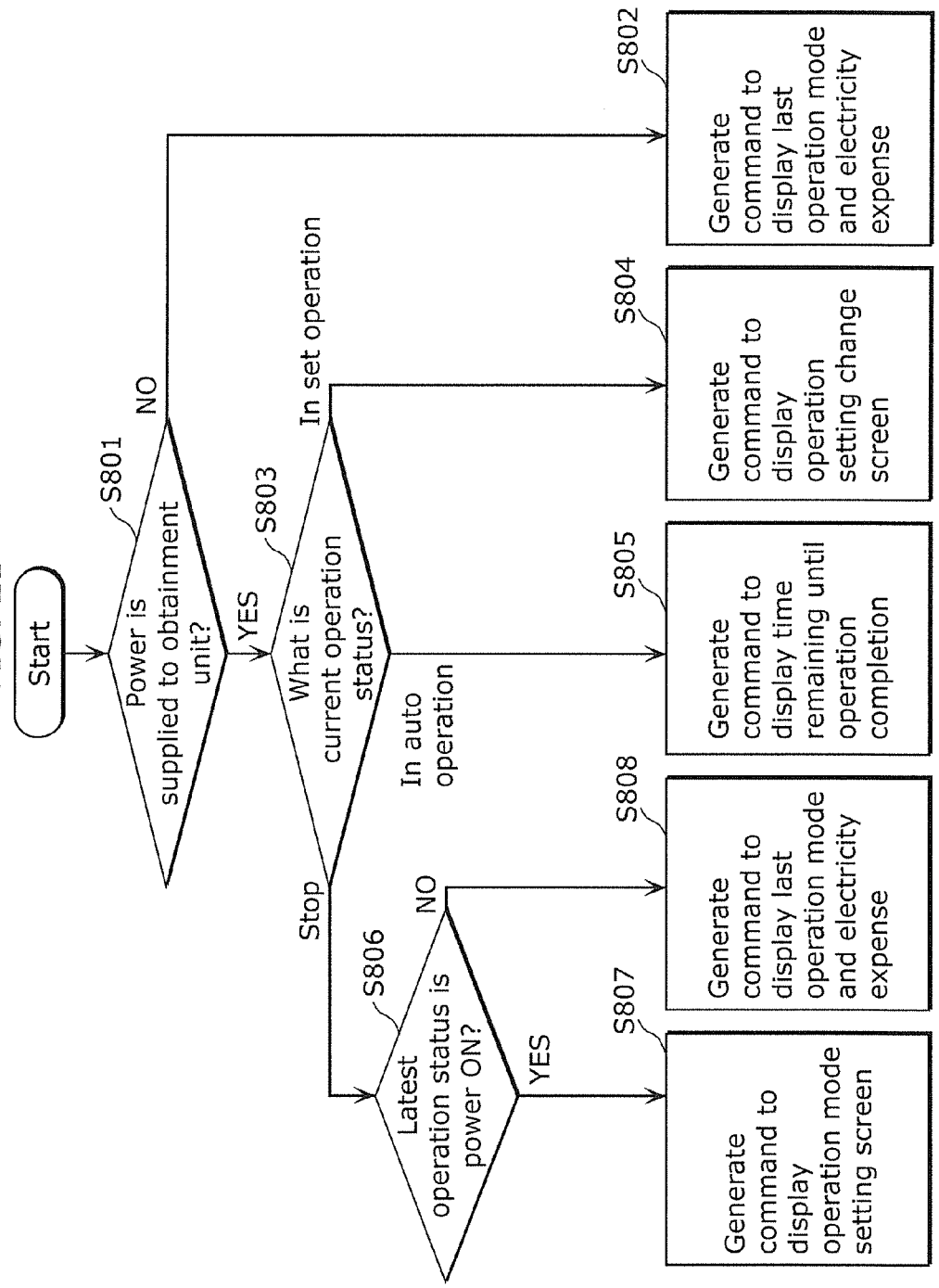
FIG. 21 is a flowchart illustrating a flow of a command generation scheme according to Embodiment 5.

An example of the command generation scheme used by the generation unit 124 in the present embodiment is described with reference to FIG. 21. FIG. 21 is a flowchart illustrating a flow of the command generation scheme according to Embodiment 5. It is to be noted that FIG. 21 is a flowchart illustrating a more specific example of each step enclosed with the dashed line in the flowchart in FIG. 5.

First, the generation unit 124 determines whether power from the first power source unit 111 is supplied to the obtainment unit 113 (S801). When determining that power from the first power source unit 111 is not supplied to the obtainment unit 113 (NO in S801), the generation unit 124 generates a command for causing the display unit 201 to display the last operation mode and the electricity expense (S802). Examples of the operation mode include "heat mode" for heating an object to be cooked and "defrost mode" for defrosting frozen object to be cooked. When the communication apparatus 10 is powered OFF as above, the user is likely to want to know the last operation mode. Thus, generating the above-described command allows the user to obtain information he/she needs on the communication apparatus 10.

On the other hand, when determining that power from the first power source unit 111 is supplied to the obtainment unit 113 (YES in S801), the generation unit 124 obtains the operation status information from the obtainment unit 113. The generation unit 124 determines the current operation status of the communication apparatus 10 based on the obtained operation status information (S803).

When the current operation status of the communication apparatus 10 is "in set operation", the generation unit 124 generates a command for causing the display unit 201 to display the operation setting change screen (S804). Here, set operation indicates an operation performed according to the setting on operation time, output wattage, and so on set by the user himself/herself. It is to be noted that the operation setting change screen is a screen through which the user changes the setting on operation time and output wattage. When the current operation status is set operation as above, since the user has set the operation time and output wattage himself/herself, the user is likely to want to change the setting on the operation time and output wattage. Thus, generating the above-described command allows the user to perform the operation he/she needs on the communication apparatus 10.

When the current operation status of the communication apparatus 10 is "in auto operation", the generation unit 124 generates a command for causing the display unit 201 to display the remaining time until operation completion (operation completion in defrost mode, for example) (S805). Here, auto operation indicates an operation performed according to the setting on operation time, output wattage, and so on set automatically by the microwave. When the current operation status is auto operation as above, the user is likely to want to know the time remaining until operation completion. Thus, generating the above-described command allows the user to obtain information he/she needs on the communication apparatus 10.

When the current operation status of the communication apparatus 10 is "stop", the generation unit 124 determines whether the latest operation status of the communication apparatus 10 is "power ON", based on the read operation history information (S806). When the latest operation status is "power ON" (YES in S806), the generation unit 124 generates a command for causing the display unit 201 to display an operation mode setting screen (S807). It is to be noted that the operation mode setting screen is a screen through which the user sets the operation mode. When the communication apparatus 10 is stopped immediately after being powered ON, the user is likely to want to use the microwave. Thus, generating the above-described command allows the user to perform operation he/she needs on the communication apparatus 10.

On the other hand, when the latest operation status is not "power ON" (NO in S806), the generation unit 124 generates a command for causing the display unit 201 to display the last operation mode and the electricity expense (S808). When the communication apparatus 10 is stopped immediately after being in the operation status other than "power ON" as above, the user is likely to want to know the last operation mode. Thus, generating the above-described command allows the user to obtain information he/she needs on the communication apparatus 10.

Embodiment 6

Overall Structure of the System

Figure 22:
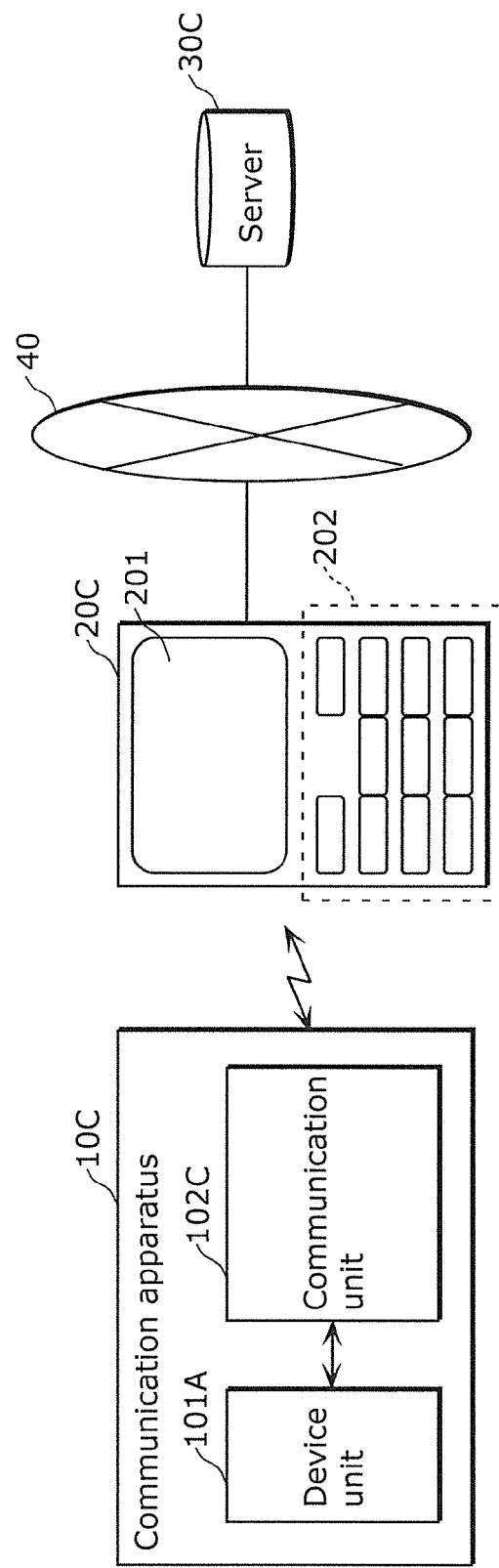
FIG. 22 illustrates a structure of a system including a communication apparatus according to Embodiment 6.

FIG. 22 shows a structure of a system including a communication apparatus 10C according to Embodiment 6. As shown in FIG. 22, the system according to the present embodiment includes the communication apparatus 10C, an external terminal 20C, and a server 30C, as in the embodiments above. Hereinafter, structures of the communication apparatus 10C, the external terminal 20C, and the server 30C are described while focusing on the difference from the above embodiments.

Structure of the Server

Figure 23:
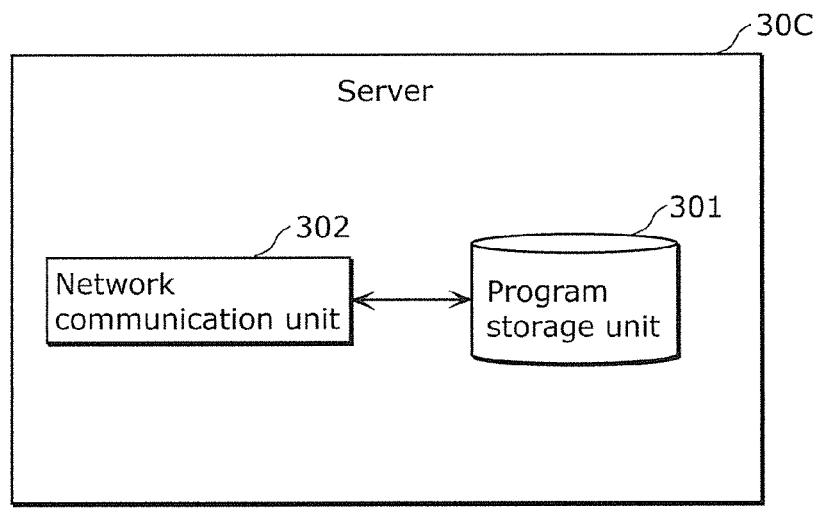
FIG. 23 is a block diagram illustrating a functional structure of a server according to Embodiment 6.

FIG. 23 is a block diagram illustrating a functional structure of the server 30C according to Embodiment 6. As shown in FIG. 23, the server 30C in the present embodiment includes a program storage unit 301 and a network communication unit 302.

The program storage unit 301 is a memory capable of storing data. The program storage unit 301 stores a program for controlling the communication apparatus 10C. This program is, for example, a program for causing a computer of the communication apparatus 10C to execute the steps S101 to S124 (see FIG. 18) of the method of controlling the communication apparatus 10C described in Embodiment 3 above. This program may be a program for causing the computer to execute steps of the method of controlling the communication apparatus described in the above embodiments other than Embodiment 3.

The network communication unit 302 transmits and receives data, etc. to and from the external terminal 20C via the Internet 40. For example, the network communication unit 302 receives a program transmission request (that is transmission request data) transmitted from the external terminal 20C. Furthermore, the network communication unit 302 transmits the program stored in the program storage unit 301 to the external terminal 20C when the program transmission request from the external terminal 20C is received.

Structure of the External Terminal

Figure 24:
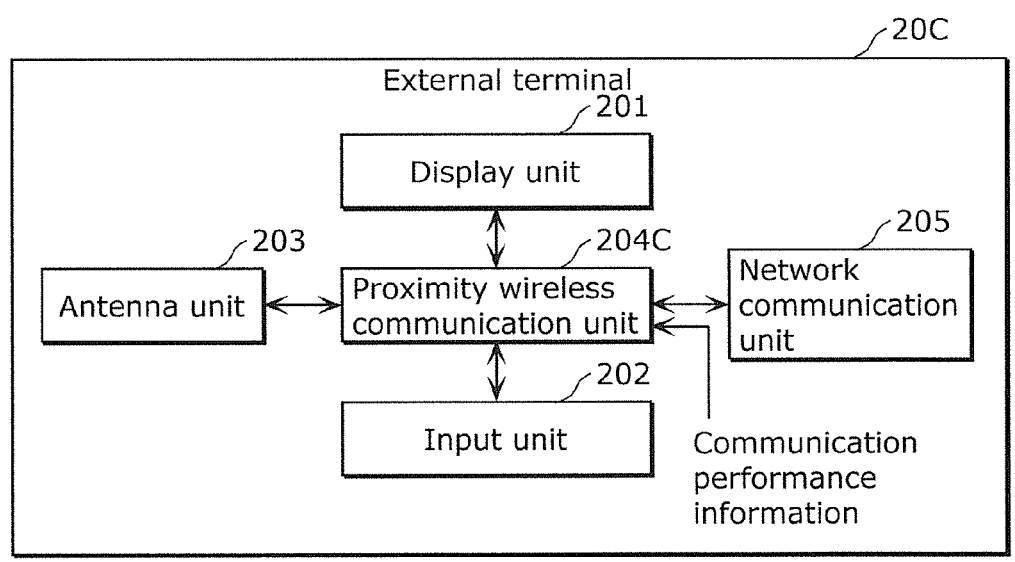
FIG. 24 is a block diagram illustrating a functional structure of an external terminal according to Embodiment 6.

FIG. 24 is a block diagram illustrating a functional structure of the external terminal 20C according to Embodiment 6. As shown in FIG. 24, the external terminal 20C in the present embodiment further includes a network communication unit 205. The network communication unit 205 transmits and receives data, etc. to and from the server 30C via the Internet 40. For example, the network communication unit 205 transmits a program transmission request to the server 30C. Furthermore, the network communication unit 205 receives the program transmitted from the server 30C, for example.

The proximity wireless communication unit 204C transmits the program received by the network communication unit 205 to the communication apparatus 10C, when proximity wireless communication is established between the external terminal 20C and the communication apparatus 10C.

It is to be noted that other structures of the external terminal 20C are the same as those of the external terminal 20B in Embodiment 3 above.

Structure of the Communication Apparatus

Figure 25:
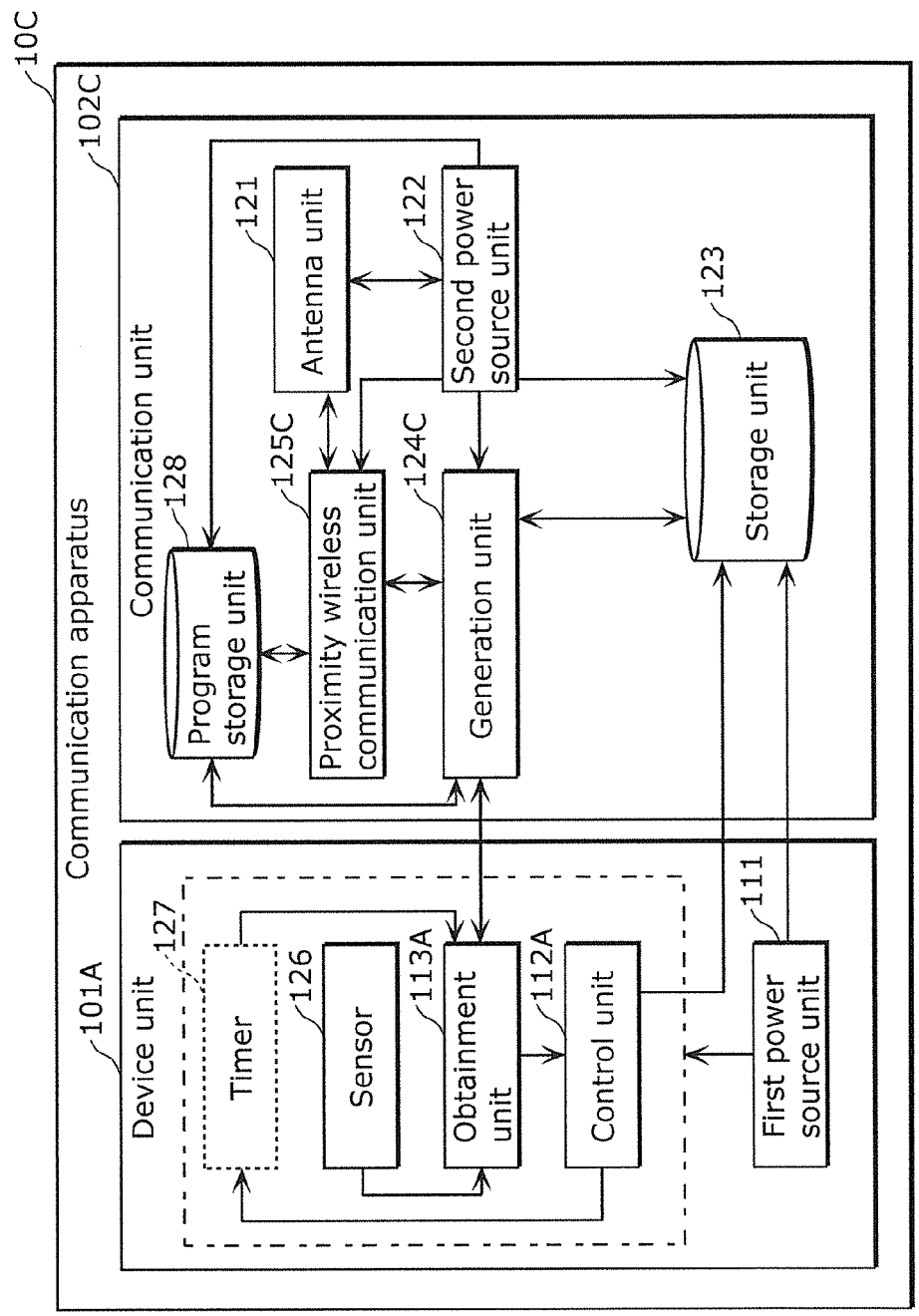
FIG. 25 is a block diagram illustrating a functional structure of a communication apparatus according to Embodiment 6.

FIG. 25 is a block diagram illustrating a functional structure of the communication apparatus 10C according to Embodiment 6. As shown in FIG. 25, the communication apparatus 10C in the present embodiment further includes a program storage unit 128. The program storage unit 128 is a memory capable of storing data. The program storage unit 128 stores the program transmitted from the external terminal 20C.

When proximity wireless communication is established between the communication apparatus 10C and the external terminal 20C, the proximity wireless communication unit 125C receives the program transmitted from the external terminal 20C and causes the program storage unit 128 to store the received program.

The generation unit 124C and the proximity wireless communication unit 125C each perform the same control as described in Embodiment 3 for example, by reading and executing the program stored in the program storage unit 128.

It is to be noted that other structures of the communication apparatus 10C are the same as those of the communication apparatus 10B in Embodiment 3 above.

Program Transmission Scheme

Figure 26:
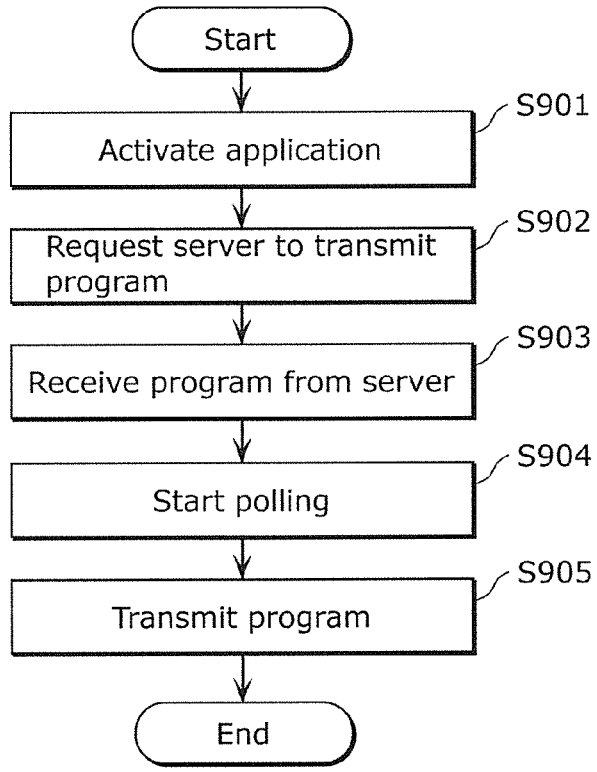
FIG. 26 is a flowchart illustrating a flow of control performed by the external terminal according to Embodiment 6.
Figure 27:
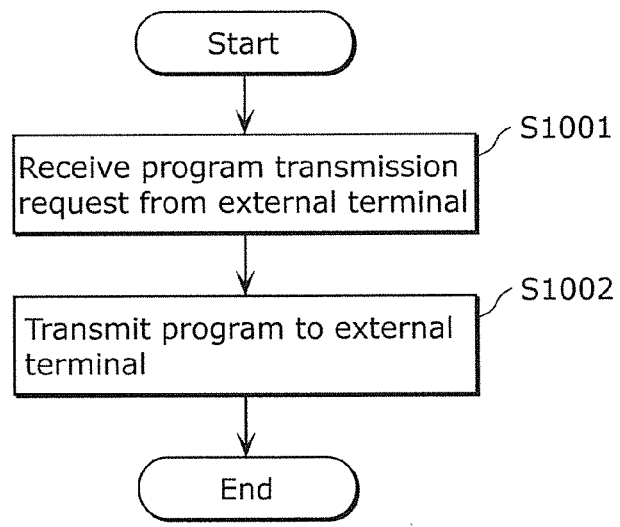
FIG. 27 is a flowchart illustrating a flow of control performed by the server according to Embodiment 6.

FIG. 26 is a flowchart illustrating a flow of control performed by the external terminal 20C according to Embodiment 6. FIG. 27 is a flowchart illustrating a flow of control performed by the server 30C according to Embodiment 6.

Figure 28:
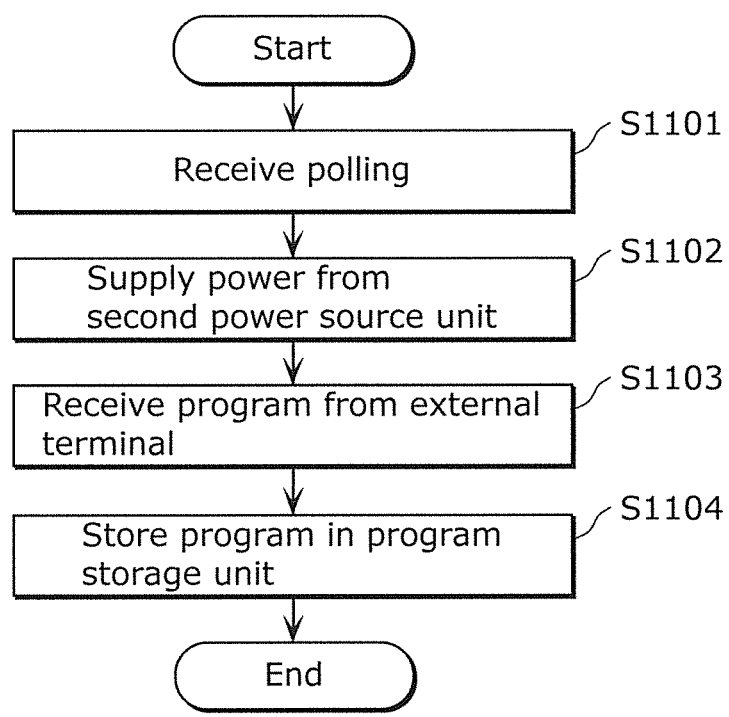
FIG. 28 is a flowchart illustrating a flow of control performed by the communication apparatus according to Embodiment 6.

FIG. 28 is a flowchart illustrating a flow of control performed by the communication apparatus 10C according to Embodiment 6.

When the user wants to download the program from the server 30C to the communication apparatus 10C, the user first activates using the input unit 202 the application installed on the external terminal 20C (S901 in FIG. 26). Then, the user operates using the input unit 202 a dedicated button provided in the application. With this, the network communication unit 205 of the external terminal 20C transmits a program transmission request to the server 30C (S902).

When receiving the program transmission request from the external terminal 20C (S1001 in FIG. 27), the network communication unit 302 of the server 30C transmits the program stored in the program storage unit 301 to the external terminal 20C (S1002).

The network communication unit 205 of the external terminal 20C receives the program transmitted from the server 30C (S903 in FIG. 26). Then, the external terminal 20C starts polling to the IC tag of the communication apparatus 10C by the user operating the dedicated button provided in the application using the input unit 202 (S904). After that, the IC tag of the communication apparatus 10C receives polling by the user holding (touching) the external terminal 20C over (to) the communication apparatus 10 (S1101 in FIG. 28).

When polling is received at the IC tag of the communication apparatus 10C, the second power source unit 122 generates power based on the radio wave obtained when receiving polling, and supplies the power to each of the storage unit 123, the generation unit 124C, the proximity wireless communication unit 125C, and the program storage unit 128 (S1102). After that, the network communication unit 205 of the external terminal 20C transmits the program to the communication apparatus 10C (S905 in FIG. 26). With this, the proximity wireless communication unit 125C receives the program transmitted from the external terminal 20C (S1103 in FIG. 28), and causes the program storage unit 128 to store the received program (S1104).

In the above manner, the program stored in the server 30C can be transmitted to the communication apparatus 10C via the external terminal 20C.

Method of Controlling the Communication Apparatus

Figure 29:
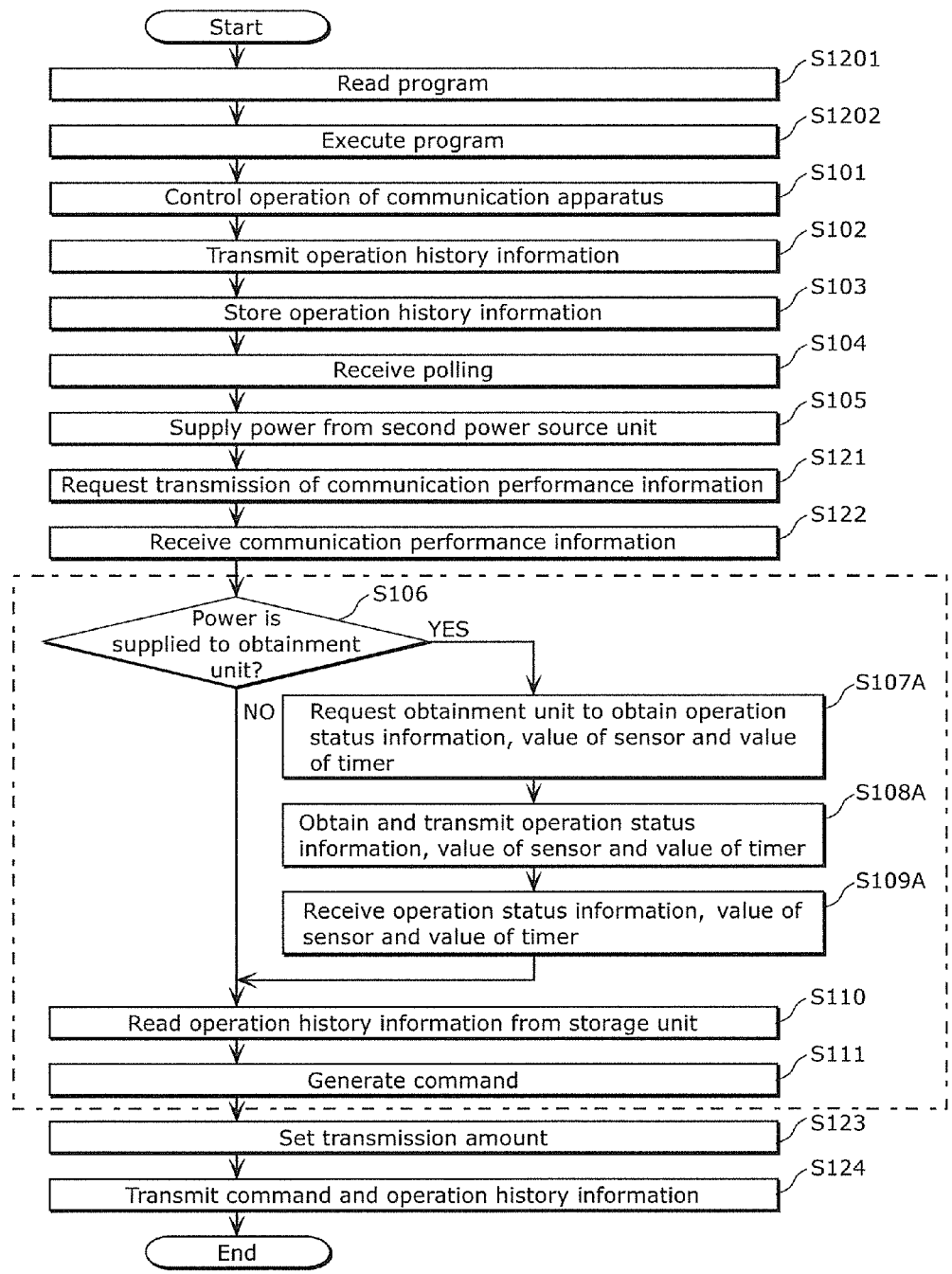
FIG. 29 is a flowchart illustrating a flow of control performed by the communication apparatus according to Embodiment 6.

FIG. 29 is a flowchart illustrating a flow of control performed by the communication apparatus 10C according to Embodiment 6. In the flowchart in FIG. 29, steps which are the same as those in FIG. 18 are assigned with the same numbers, and the description is omitted.

First, each of the generation unit 124C and the proximity wireless communication unit 125C reads the program stored in the program storage unit 128 (S1201), and executes the read program (S1202). With this, each of the generation unit 124C and the proximity wireless communication unit 125C executes the steps S101 to S124 based on the read program, in the same manner as described in Embodiment 3 above.

It is to be noted that the program to be downloaded may be a program for controlling the entire communication apparatus 10C as described above or a partial program for executing the function of the generation unit 124C. When the program to be downloaded is the partial program for executing the function of the generation unit 124C, it is sufficient to perform the reading of the program in S1201 described in FIG. 29 any time earlier than S111, without being limited to the order in S1201.

It is to be noted that in each of the above non-limiting embodiments, each constituent element may be implemented by being configured with a dedicated hardware or being executed by a software program appropriate for each constituent element. Each constituent element may be implemented by reading and executing the software program recorded in a hard disk or a recording medium, such as a semiconductor memory, by a program execution unit such as a CPU or a processor. Here, the software which implements the communication apparatus or the like in each of the above embodiments is a program described below.

Specifically, the program is a program for controlling a communication apparatus which communicates with an external terminal, the program causing a computer to execute: obtaining operation status information indicating a current operation status of the communication apparatus when first power from a main power source is supplied to the communication apparatus; storing operation history information indicating a past operation status of the communication apparatus when the first power is supplied to the communication apparatus; receiving a radio wave output from the external terminal by an antenna unit of the communication apparatus; generating a command for controlling the external terminal using second power generated using the radio wave received by the antenna unit, including: generating the command based on the operation history information and the operation status information when the first power is supplied to the communication apparatus; and generating the command based on the operation history information when the first power is not supplied to the communication apparatus; and transmitting the command to the external terminal through proximity wireless communication using the second power.

The above has described a communication apparatus, a method for controlling the communication apparatus, a program, and a server, according to one or a plurality of aspects based on the embodiments. However, the present invention is not limited to the embodiments. Other forms in which various modifications apparent to those skilled in the art are applied to the embodiments, or forms structured by combining constituent elements of different embodiments, may be included within the scope of one or a plurality of aspects, unless such changes and modifications depart from the scope of the present invention.

Although the system in each of the embodiments includes the server connected to the external terminal via the Internet, this server may be omitted. In this case, the information displayed on the display unit of the external terminal is generated within the external terminal.

Although the embodiments have been described based on the cases where the communication apparatus is a home appliance for standard household use, the communication apparatus may be a machine tool used at factories for industrial use.

Although the description has been provided based on the case where the generation unit is provided inside the communication apparatus in the embodiments, the generation unit does not have to be provided inside the external terminal. In this case, the generation unit generates a command in the external terminal by reading the operation status information and the operation history information from the communication apparatus. Alternatively, the generation unit may be provided in the server. In this case, the generation unit generates a command in the server by reading the operation status information and the operation history information from the communication apparatus.

The present invention can be applied for a communication apparatus and so on which communicates with an external terminal.

REFERENCE SIGNS LIST

10, 10A, 10B, 10C Communication apparatus
20, 20B, 20C External terminal
30, 30C Server
40 Internet
101, 101A Device unit
102, 102A, 102B, 102C Communication unit 111 First power source unit
112, 112A Control unit
113, 113A Obtainment unit
121, 203 Antenna unit
122 Second power source unit
123 Storage unit
124, 124A, 124B, 124C Generation unit
125, 125B, 125C, 204, 204B, 204C Proximity wireless communication unit
126 Sensor
127 Timer
128, 301 Program storage unit
201 Display unit
202 Input unit
205, 302 Network communication unit

The invention claimed is:

1. A communication apparatus which communicates with an external terminal, the communication apparatus comprising:
a device unit configured to cause the communication apparatus to operate; and
a communication unit configured to perform proximity wireless communication with the external terminal,
wherein the device unit includes:
a first power source unit configured to supply power to the communication apparatus, the first power source unit being a main power source of the communication apparatus;
a control unit configured to control an operation of the communication apparatus; and
an obtainment unit configured to obtain operation status information indicating a current operation status of the communication apparatus controlled by the control unit,
the communication unit includes:
an antenna unit configured to receive a radio wave transmitted from the external terminal;
a storage unit configured to store operation history information indicating a past operation status of the communication apparatus controlled by the control unit;
a generation unit configured to generate a command for controlling the external terminal;
a proximity wireless communication unit configured to transmit the command to the external terminal via the antenna unit through proximity wireless communication; and
a second power source unit configured to generate power using the radio wave received by the antenna unit and to supply the power to each of the storage unit, the generation unit, and the proximity wireless communication unit, and
when the power is supplied from the second power source unit to each of the storage unit, the generation unit, and the proximity wireless communication unit, the generation unit is configured to:
generate the command based on the operation history information read from the storage unit and the operation status information obtained by the obtainment unit when the power is supplied from the first power source unit to the communication apparatus; and
generate the command based on the operation history information read from the storage unit when the power is not supplied from the first power source unit to the communication apparatus.

2. The communication apparatus according to claim 1,
wherein the generation unit is configured to generate the command for causing a display unit of the external terminal to display screen information.

3. The communication apparatus according to claim 1,
wherein the generation unit is configured to request the obtainment unit to obtain the operation status information when the power is supplied from the first power source unit to the communication apparatus and the power is supplied from the second power source unit to each of the storage unit, the generation unit, and the proximity wireless communication unit, and
the obtainment unit is configured to obtain the operation status information when requested by the generation unit to obtain the operation status information.

4. The communication apparatus according to claim 1,
wherein the device unit further includes a sensor which detects a value relating to the communication apparatus, and
the generation unit is configured to obtain the value detected by the sensor and generate the command based on the obtained value of the sensor.

5. The communication apparatus according to claim 4,
wherein the device unit further includes a timer which measures an elapsed time from a time of a change in the value of the sensor,
the control unit is configured to activate the timer at the time of the change in the value of the sensor, and
the generation unit is configured to obtain a value of the timer and generate the command based on the obtained value of the timer and the value of the sensor.

6. The communication apparatus according to claim 1,
wherein the proximity wireless communication unit is configured to transmit the operation history information together with the command to the external terminal.

7. The communication apparatus according to claim 6,
wherein the proximity wireless communication unit is further configured to obtain communication performance information of the external terminal transmitted from the external terminal, and to set a transmission amount of the operation history information based on the obtained communication performance information.

8. A method of controlling a communication apparatus which communicates with an external terminal, the method comprising:
obtaining operation status information indicating a current operation status of the communication apparatus when a first power from a main power source is supplied to the communication apparatus;
storing operation history information indicating a past operation status of the communication apparatus when the first power is supplied to the communication apparatus;
receiving a radio wave transmitted from the external terminal by an antenna unit of the communication apparatus;
generating a command for controlling the external terminal using a second power generated based on the radio wave received by the antenna unit; and
transmitting the command to the external terminal through proximity wireless communication using the second power,
wherein the generating of a command includes:
generating the command based on the operation history information and the operation status information when the first power is supplied to the communication apparatus; and
generating the command based on the operation history information when the first power is not supplied to the communication apparatus.

9. A server comprising:
a program storage unit configured to store a program for controlling a communication apparatus which communicates with an external terminal; and
a network communication unit configured to transmit the program stored in the program storage unit to the communication apparatus via the external terminal,
wherein the program comprises:
obtaining operation status information indicating a current operation status of the communication apparatus when a first power from a main power source is supplied to the communication apparatus;
storing operation history information indicating a past operation status of the communication apparatus when the first power is supplied to the communication apparatus;
receiving a radio wave transmitted from the external terminal by an antenna unit of the communication apparatus;
generating a command for controlling the external terminal using a second power generated based on the radio wave received by the antenna unit, including: generating the command based on the operation history information and the operation status information when the first power is supplied to the communication apparatus; and generating the command based on the operation history information when the first power is not supplied to the communication apparatus; and
transmitting the command to the external terminal through proximity wireless communication using the second power.

* * * * *